(12) United States Patent
Tanaka et al.

(10) Patent No.: US 10,447,053 B2
(45) Date of Patent: Oct. 15, 2019

(54) TERMINAL

(71) Applicant: PANASONIC INTELLECTUAL PROPERTY MANAGEMENT CO., LTD., Osaka (JP)

(72) Inventors: Yuki Tanaka, Tokyo (JP); Ryosuke Hasaba, Kanagawa (JP); Yoshio Koyanagi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 177 days.

(21) Appl. No.: 15/827,392

(22) Filed: Nov. 30, 2017

(65) Prior Publication Data

US 2018/0183256 A1 Jun. 28, 2018

(30) Foreign Application Priority Data

Dec. 27, 2016 (JP) .................................. 2016-254128
Dec. 27, 2016 (JP) .................................. 2016-254129
(Continued)

(51) Int. Cl.
*H02J 7/00* (2006.01)
*H02M 1/00* (2006.01)
(Continued)

(52) U.S. Cl.
CPC ........ *H02J 7/0068* (2013.01); *G06K 7/10158* (2013.01); *G06K 19/0708* (2013.01);
(Continued)

(58) Field of Classification Search
CPC ........... H02J 7/0068; H02J 50/20; H02M 1/00
See application file for complete search history.

(56) References Cited

U.S. PATENT DOCUMENTS

2011/0221416 A1 9/2011 Ivanov et al.
2015/0311707 A1 10/2015 Ikenaga
(Continued)

FOREIGN PATENT DOCUMENTS

JP 2014-217250 11/2014
JP 2015-211574 11/2015
(Continued)

*Primary Examiner* — Alfonso Perez Borroto
(74) *Attorney, Agent, or Firm* — Greenblum & Bernstein, P.L.C.

(57) ABSTRACT

A terminal includes an RF-DC conversion circuit outputting DC current by converting AC current received via wireless communication into DC current, a DC-DC converter connected to an output side of RF-DC conversion circuit to convert a voltage of DC current output from RF-DC conversion circuit to a predetermined voltage, and a controller controlling connection and disconnection between RF-DC conversion circuit and DC-DC converter. Controller acquires open circuit voltage Vin_oc on an output side of RF-DC conversion circuit, which is obtained when RF-DC conversion circuit and DC-DC converter are disconnected from each other, and target voltage αVin_oc (0<α<1) obtained by dividing open circuit voltage Vin_oc. When RF-DC conversion circuit and DC-DC converter are connected to each other, controller performs feedback control of DC-DC converter so that an input voltage Vin on a side where DC-DC converter is connected to RF-DC conversion circuit is equal to target voltage αVin_oc.

6 Claims, 14 Drawing Sheets

(30) Foreign Application Priority Data

Dec. 27, 2016 (JP) .................... 2016-254130
Dec. 27, 2016 (JP) .................... 2016-254131

(51) Int. Cl.

| | | |
|---|---|---|
| H02J 50/20 | (2016.01) | |
| G06K 7/10 | (2006.01) | |
| G06K 19/07 | (2006.01) | |
| H02M 7/02 | (2006.01) | |
| H02M 3/04 | (2006.01) | |

(52) U.S. Cl.

CPC ............ *H02J 50/20* (2016.02); *H02M 1/00* (2013.01); *H02M 3/04* (2013.01); *H02M 7/02* (2013.01); *H02M 2001/0009* (2013.01)

(56) References Cited

U.S. PATENT DOCUMENTS

| | | | | |
|---|---|---|---|---|
| 2015/0311824 | A1* | 10/2015 | Eltamaly | H02N 2/181 310/319 |
| 2015/0365013 | A1* | 12/2015 | Hameed | H02M 7/25 363/126 |
| 2016/0099582 | A1* | 4/2016 | Ramorini | H02J 7/0052 320/162 |
| 2016/0139565 | A1* | 5/2016 | Chen | H02J 7/025 |
| 2016/0172868 | A1* | 6/2016 | Sequeira | H02J 5/005 307/104 |
| 2016/0181867 | A1* | 6/2016 | Daniel | H01Q 9/16 307/104 |
| 2016/0226381 | A1 | 8/2016 | Gao et al. | |
| 2016/0291983 | A1* | 10/2016 | Calhoun | G06F 9/4401 |
| 2017/0294691 | A1 | 10/2017 | Yamamoto et al. | |

FOREIGN PATENT DOCUMENTS

| | | |
|---|---|---|
| JP | 5857119 | 12/2015 |
| JP | 5921447 | 4/2016 |
| JP | 2016-146156 | 8/2016 |
| WO | 2011/112228 | 9/2011 |

* cited by examiner

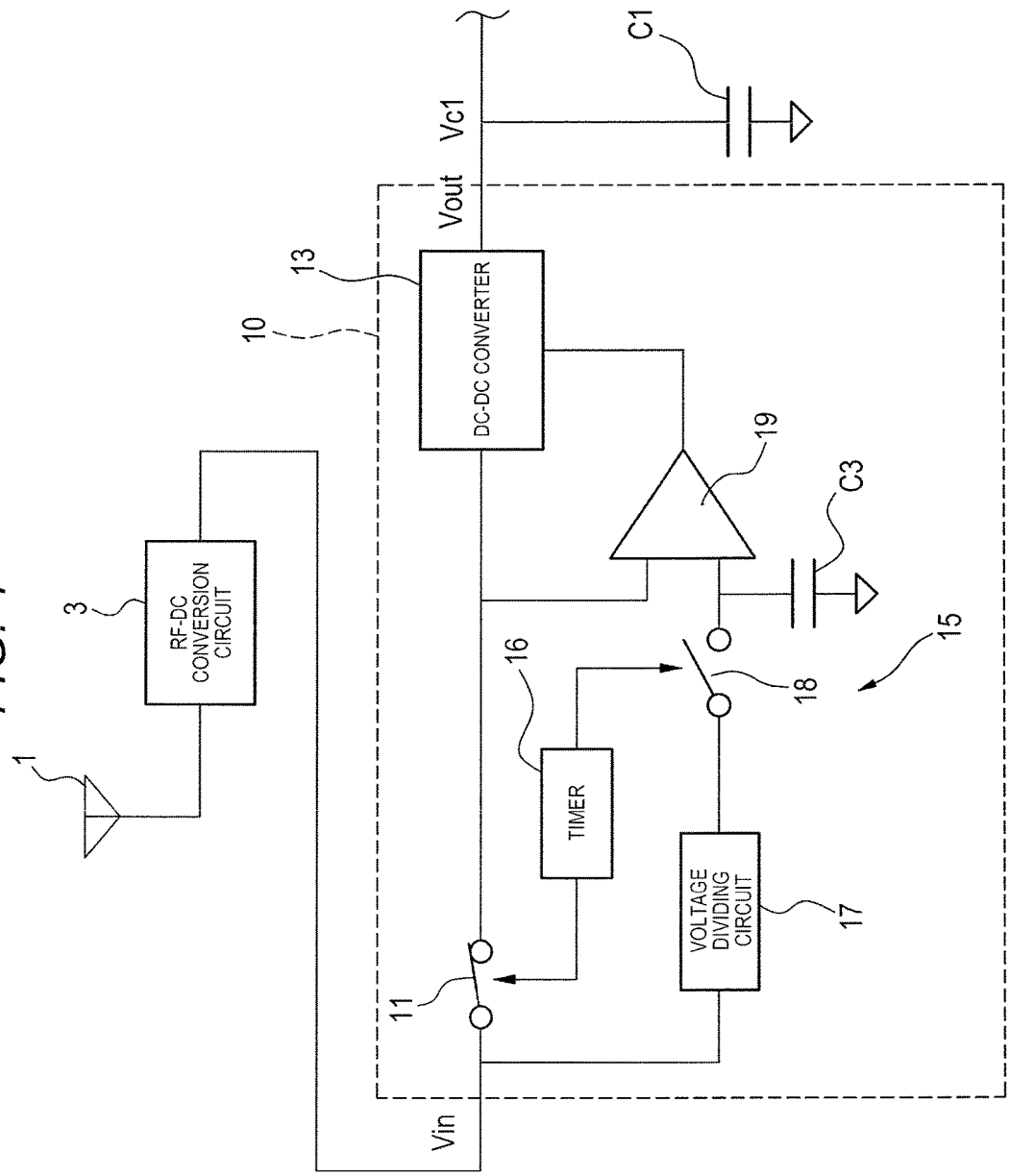

TERMINAL

BACKGROUND

1. Technical Field

The present disclosure relates to an energy harvest terminal.

2. Description of the Related Art

Currently, in a sensor terminal configuring a wireless sensor network, a primary battery such as a button battery, a solar battery, and a thermoelectric conversion element are used as a power source. However, the primary battery needs battery replacement, and the solar battery or the thermoelectric conversion element is expensive in material cost. A problem relating to this power source is a barrier to the widespread use of the wireless sensor network.

In a case where a radio-frequency identification (RFID) is used as a communication system, communication radio waves are not voluntarily transmitted from the sensor terminal, and the sensor terminal has low power consumption. Accordingly, energy harvest (energy generation from ambient sources) can be used as the power source. The energy harvest is a technique for collecting power from energy existing in the surroundings, and is preferably applied to a low power consumption device such as the sensor terminal herein. The energy harvest uses light, thermoelectricity, vibrations, or electromagnetic waves. RF energy harvest using the electromagnetic waves partially or entirely employs wireless power as the power source. In this manner, it is possible to realize a wireless sensor terminal which does not require battery replacement.

The wireless power distributed in the environment greatly fluctuates due to factors such as a distance from a transmitter, reflection, and interference. This causes a problem when the wireless power is applied to the sensor terminal. Therefore, it is necessary to adopt a power management configuration so that the energy harvest realizes highly efficient sensor drive. Accordingly, techniques dealing with various problems as described below have been proposed in the related art.

Japanese Patent Unexamined Publication No. 2015-211574 discloses a power source circuit capable of fast starting. The power source circuit includes a plurality of voltage sources, a switch circuit for switching between a state where the plurality of voltage sources are connected to each other in series and a state where the plurality of voltage sources are connected to each other in parallel, and a voltage control circuit for boosting the input voltage. The switch circuit connects the plurality of voltage sources to each other in series, and supplies an output of the plurality of voltage sources connected to each other in series to an output node of the voltage control circuit. Thereafter, the switch circuit connects the plurality of voltage sources connected to each other in parallel, and supplies the output of the plurality of voltage sources connected to each other in parallel to the voltage control circuit. The voltage control circuit boosts a voltage of the plurality of voltage sources connected to each other in parallel.

Japanese Patent No. 5921447 provides an energy harvesting system for transmitting energy from an energy harvester having an output impedance to a DC-DC converter. A maximum power point tracking (MPPT) circuit includes a replica impedance showing a multiple of a harvester output impedance. The MPPT circuit applies a voltage equal to an output voltage of the harvester across the replica impedance so as to generate a feedback current equal to an input current received from the harvester, which is divided by the multiple, and provides maximum power point tracking between the harvester and the DC-DC converter.

Japanese Patent Unexamined Publication No. 2014-217250 provides a thermoelectric generator capable of taking out maximum output power from a thermoelectric generating element with a simple circuit. The thermoelectric generator includes the thermoelectric generating element, an operating point setting circuit connected to the thermoelectric generating element so as to set an operating point, based on an output of the thermoelectric generating element at every predetermined timing, a sequence circuit for supplying a sample hold signal to the operating point setting circuit, a DC/DC converter connected to the operating point setting circuit so as to output an output voltage, and an error amplifier connected to the output of the DC/DC converter so as to supply a feedback signal to the DC/DC converter.

Japanese Patent Unexamined Publication No. 2016-146156 discloses a power source control circuit capable of supplying stable power to various loads while suppressing an increase in a circuit occupied area. The power source control circuit has a capacitor connected between a first power source line to which a first power source voltage is applied and a second power source line to which a second power source voltage different from the first power source voltage is applied, a first switching element disposed between the first and second power source lines and connected to the loads in series, a first switch element connected in series with the load, and a differential voltage monitoring circuit which monitors a differential voltage between the first power source voltage and the second power source voltage so as to perform on-off control of the first switching element. When the differential voltage rises, if the differential voltage is equal to or higher than a first reference voltage, the differential voltage monitoring circuit controls the first switch element to be turned on. When the differential voltage drops, if the differential voltage is equal to or lower than a second reference voltage, the differential voltage monitoring circuit controls the first switch element to be turned off.

Japanese Patent No. 5857119 discloses a power storage system dealing with the following problem. Similarly to a power source device in the related art, several hours are required until a load device operation is restored in order to charge a lithium ion capacitor having large capacity. In the power storage system, a first power storage battery with large capacity and low leakage and a second power storage battery with small capacity are connected to each other via a switch, and the switch is controlled in accordance with a voltage. In this manner, the power storage system aims to compatibly achieve fast starting and battery excessive discharge prevention.

SUMMARY

According to the technique disclosed in Japanese Patent Unexamined Publication No. 2015-211574, it is necessary to provide a plurality of energy harvester circuits. A plurality of transistors are inserted into a current path in series, thereby increasing power loss. According to the technique disclosed in Japanese Patent No. 5921447, an input/output voltage of an operational amplifier is equal to an input power source voltage. Consequently, a rail-to-rail operational amplifier is required, thereby increasing the number of transistors. In addition, the replica impedance has a great resistance value.

Thus, a large area is required in a case where the replica impedance is mounted on an integrated circuit. The technique disclosed in Japanese Patent Unexamined Publication No. 2014-217250 employs the thermoelectric generating element, and employs the energy harvest different from the RF energy harvest.

The technique disclosed in Japanese Patent Unexamined Publication No. 2016-146156 employs the differential voltage monitoring circuit so as to drive the load. However, there is no sufficient countermeasure for voltage drop caused by load drive, and a relatively large capacitor is needed. Japanese Patent No. 5857119 discloses the technique on the assumption that the first power storage battery having the large capacity is provided with low leakage. In a case where both the first power storage battery and the second power storage battery are discharged, it takes a long time for restarting.

As described above, the proposed techniques in the related art have some problems from a viewpoint of power consumption, device downsizing, and a starting time.

The present disclosure relates to an energy harvest terminal which can more efficiently utilize wireless power compared to the techniques in the related art.

According to the present disclosure, there is provided an energy harvest terminal including an RF-DC conversion circuit that outputs a DC current by converting an AC current received via wireless communication into the DC current, a DC-DC converter that is connected to an output side of the RF-DC conversion circuit so as to convert a voltage of the DC current output from the RF-DC conversion circuit to a predetermined voltage, and a controller that controls connection and disconnection between the RF-DC conversion circuit and the DC-DC converter. The controller acquires open circuit voltage Vin_oc on an output side of the RF-DC conversion circuit, which is obtained when the RF-DC conversion circuit and the DC-DC converter are disconnected from each other. When the RF-DC conversion circuit and the DC-DC converter are connected to each other, the controller performs feedback control of the DC-DC converter so that an input voltage Vin on a side where the DC-DC converter is connected to the RF-DC conversion circuit is equal to a target voltage.

According to the present disclosure, there is provided an energy harvest terminal including a power storage device, a voltage detection circuit that is connected to the power storage device via a power source line, and that can detect a voltage of the power storage device, and an MPU that controls a load driven by receiving power supplied from the power storage device. If the voltage detection circuit detects that a charging voltage of the power storage device reaches a predetermined starting voltage, the MPU enters an operation mode for controlling the load. When an operation of the load is stopped, the MPU proceeds to a sleep mode from the operation mode. In the sleep mode, if the voltage detection circuit detects that the charging voltage of the power storage device reaches the starting voltage, the MPU enters the operation mode for controlling the load again, and a timer of the MPU counts a sleep time which is a time in the sleep mode. Based on the sleep time and the starting voltage, the MPU calculates charging power of the power storage device in the sleep mode.

According to the present disclosure, there is provided an energy harvest terminal including a first power storage device configured to include a capacitor, a second power storage device that has larger power capacity than the first power storage device, a current limiter that is disposed in a connection line connecting the first power storage device and the second power storage device to each other so as to open and close the connection line, a current detection circuit that is disposed in the connection line, and that detects a current flowing from the first power storage device to the second power storage device so as to output a voltage corresponding to the current, and a switching regulator that detects an output voltage of the current detection circuit, and that performs a switching operation of the current limiter so that the output voltage is equal to a predetermined reference voltage.

According to the present disclosure, there is provided an energy harvest terminal including a power storage device, a voltage detection circuit that is connected to the power storage device via a power source line, and that can detect a charging voltage of the power storage device, and a plurality of loads that are connected via a switch to the power source line in parallel, and that receive power supplied from the power storage device. When the charging voltage of the power storage device reaches a predetermined threshold voltage, the voltage detection circuit turns on a switch of a first load serving as at least one load of the plurality of loads so as to start the first load. The first load sequentially turns on each switch of other loads so as to sequentially start other loads.

According to the energy harvest terminal in the present disclosure, wireless power from outside can be highly efficiently utilized.

BRIEF DESCRIPTION OF THE DRAWINGS

FIG. 4 is a block diagram illustrating details of an MPPT control circuit;

DETAILED DESCRIPTION

Figure 1:
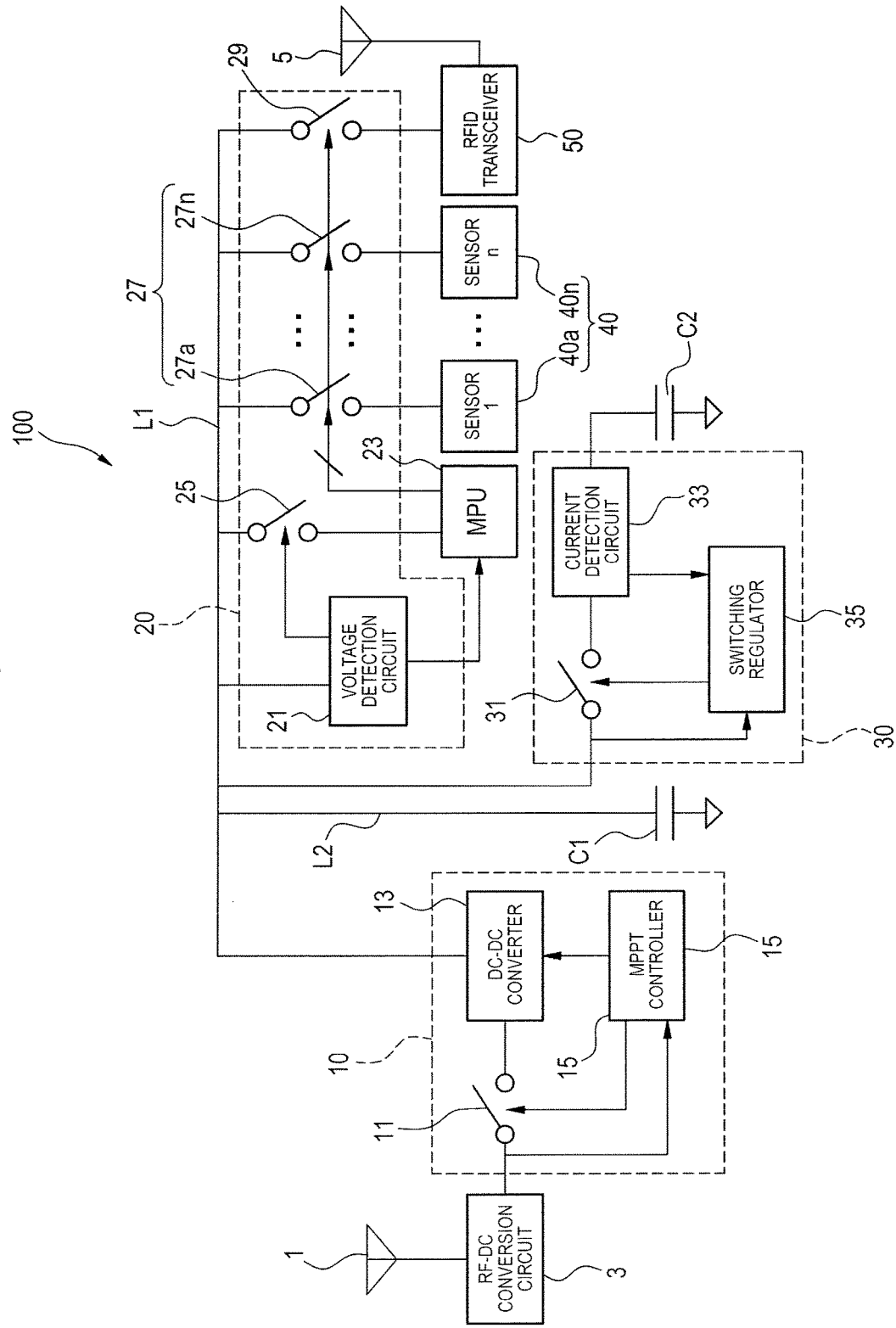
FIG. 1 is a block diagram according to an exemplary embodiment of an energy harvest terminal in the present disclosure.

Hereinafter, referring to the drawings as appropriate, an exemplary embodiment (hereinafter, referred to as the "present example embodiment") will be described in detail in which an energy harvest terminal according to the present disclosure is specifically disclosed. However, in some cases, detailed description more than necessary may be omitted. For example, in some cases, detailed description of well-known matters or repeated description of substantially the same configuration may be omitted. This is to avoid the following description from being unnecessarily redundant, and to facilitate understanding of those skilled in the art. The accompanying drawings and the following description are provided to enable those skilled in the art to fully understand the present disclosure, and are not intended to limit the gist of the present disclosure.

Hereinafter, a preferred exemplary embodiment according to the present disclosure will be described in detail with reference to the drawings.

Overall Configuration

FIG. 1 is a block diagram according to an exemplary embodiment of an energy harvest terminal in the present disclosure. Energy harvest terminal 100 includes first antenna 1, radio frequency-direct current (RF-DC) conversion circuit 3, maximum power point tracking (MPPT) control circuit 10, sequence starting circuit 20, capacitor charging circuit 30, sensor 40, RFID transceiver 50, second antenna 5, first capacitor (first power storage device) C1, and second capacitor (second power storage device) C2.

Energy harvest terminal 100 receives power by receiving a radio wave of radio communication (power supply technology) from an external RFID communication node such as an RFID reader/writer, and utilizes an electromagnetic wave energy harvest for starting. An application field of energy harvest terminal 100 is not particularly limited. For example, energy harvest terminal 100 may adopt an aspect of various electronic devices or chips. It is expected that energy harvest terminal 100 is utilized as a terminal for realizing so-called "Internet of Things (IoT)", in which various things are connected to a communication network such as the Internet so as to mutually control the things by promoting information exchange. Energy harvest terminal 100 is assumed to be installed in various places such as factories, houses, nursing care facilities, various infrastructures such as roads, or human bodies. Energy harvest terminal 100 in this exemplary embodiment can be driven by power supplied from outside, and a large quantity of energy harvest terminals is relatively easily installed in various places since an independent power source is unnecessary.

First antenna 1 receives a radio wave (wireless power) having a predetermined frequency (for example, a microwave of 920 MHz) from an external RFID communication node. RF-DC conversion circuit 3 converts an AC current corresponding to AC wireless power of the radio wave received by first antenna 1 into a DC current, and outputs the DC current.

MPPT control circuit 10 includes first switch 11, DC-DC converter 13, and MPPT controller (controller) 15. DC power obtained by RF-DC conversion circuit 3 is greatly influenced by a reception environment of the radio wave received by first antenna 1, and a magnitude of the DC power largely fluctuates with the lapse of time. MPPT control circuit 10 obtains a combination of the current and the voltage (=current×voltage=power), that is, the maximum power point, which can obtain the largest output in response to fluctuations for largely fluctuating reception (direct current) power. Details of MPPT control circuit 10 will be described later.

Sequence starting circuit 20 includes voltage detection circuit 21, micro processing unit (MPU) 23, second switch 25, third switch 27, and fourth switch 29. Sequence starting circuit 20 suppresses a voltage drop by starting various loads with a predetermined time difference in response to a power storage voltage of first capacitor (first power storage device) C1. Details of sequence starting circuit 20 will be described later.

Capacitor charging circuit 30 includes fifth switch 31, current detection circuit 33, and switching regulator 35. Capacitor charging circuit 30 charges or discharges first capacitor C1 and second capacitor C2 in an optimum mode. Details of capacitor charging circuit 30 will be described later.

Sensor 40 is provided in accordance with a specific value of the external environment to be detected by energy harvest terminal 100, and is a load which needs power supply for starting. For example, sensor 40 is a temperature sensor in a case where the specific value of the external environment is temperature, and is a pressure sensor in a case where the specific value is pressure. It is possible to provide plurality of sensors 40a, . . . 40n for one energy harvest terminal 100.

RF transceiver 50 and antenna 5 which serve as a wireless transceiver transmit a value acquired by sensor 40 to an external RFID communication node. RFID transceiver 50 is a load which needs power supply for starting.

Figure 2A:
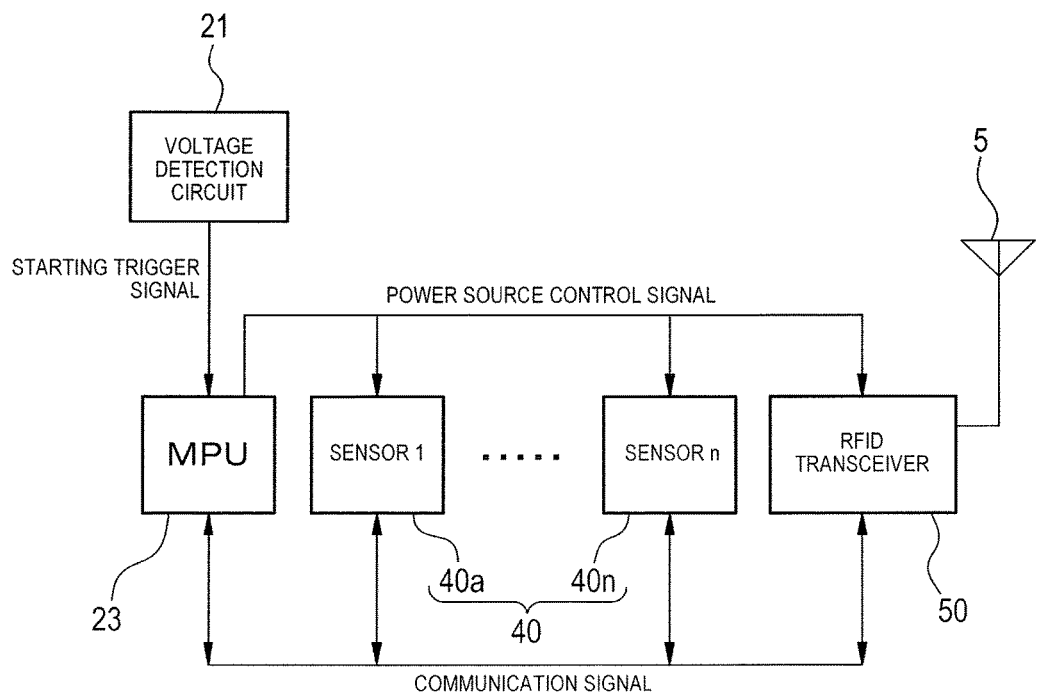
FIG. 2A illustrates a basic operation of the energy harvest terminal, and is a block diagram illustrating each flow of various signals.
Figure 2B:
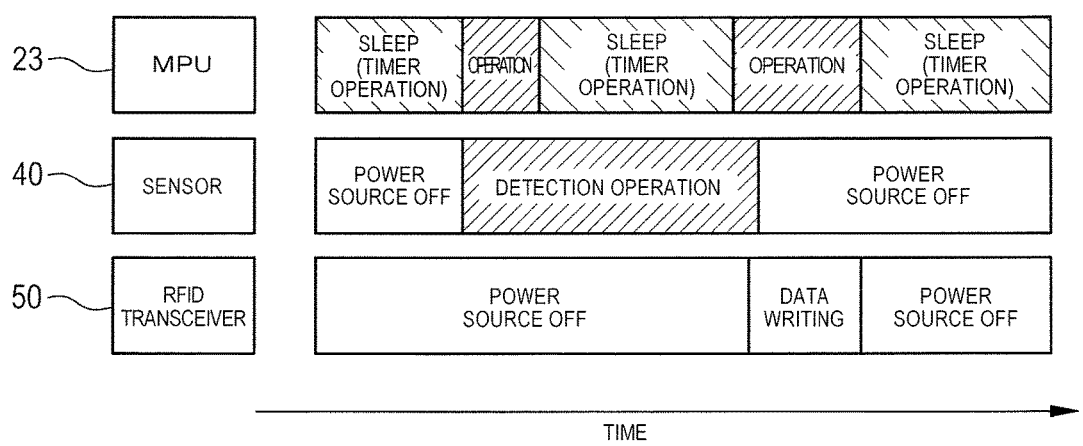
FIG. 2B illustrates a basic operation of the energy harvest terminal, and is a time slot chart illustrating control timing.

FIGS. 2A and 2B illustrate a basic operation performed by energy harvest terminal 100. As illustrated in FIG. 2A, voltage detection circuit 21 transmits a starting trigger signal to MPU 23, based on the voltage of first capacitor C1 serving as one power source. MPU 23 is a microcomputer which controls an overall operation of energy harvest terminal 100. Based on the starting trigger signal, MPU 23 starts, and controls sensor 40 and RFID transceiver 50 while transmitting a power source control signal in order to suppress power consumption. The MPU 23 acquires detection data from sensor 40 by using a communication signal, performs predetermined calculation, and writes calculation data on RFID transceiver 50.

As illustrated by a time slot chart in FIG. 2B, as a detection operation of sensor 40 starts, MPU 23 starts an operation so as to acquire detection data from sensor 40, and performs calculation. Thereafter, MPU 23 restarts the operation through a sleep mode, and then, a process of writing the calculation data on RFID transceiver 50 is performed. RFID transceiver 50 causes second antenna 5 to transmit the written calculation data to an external RFID communication node at predetermined timing. As a result, a user can easily obtain a lot of various values (temperature or pressure) detected by various sensors from the external RFID communication node.

MPPT Control

A value of power which can be acquired from the external RFID communication node by first antenna 1 and RF-DC conversion circuit 3 largely fluctuates depending on the environment, and an output voltage of RF-DC conversion circuit 3 fluctuates from moment to moment. Here, when the input voltage of the alternating current (from first antenna 1) of the general RF-DC conversion circuit is converted into the output voltage of the direct current, conversion efficiency is greatly changed in response to the input voltage. Furthermore, it is known that the output voltage at which the conversion efficiency is maximized fluctuates in response to the fluctuations of the input voltage.

Figure 3A:
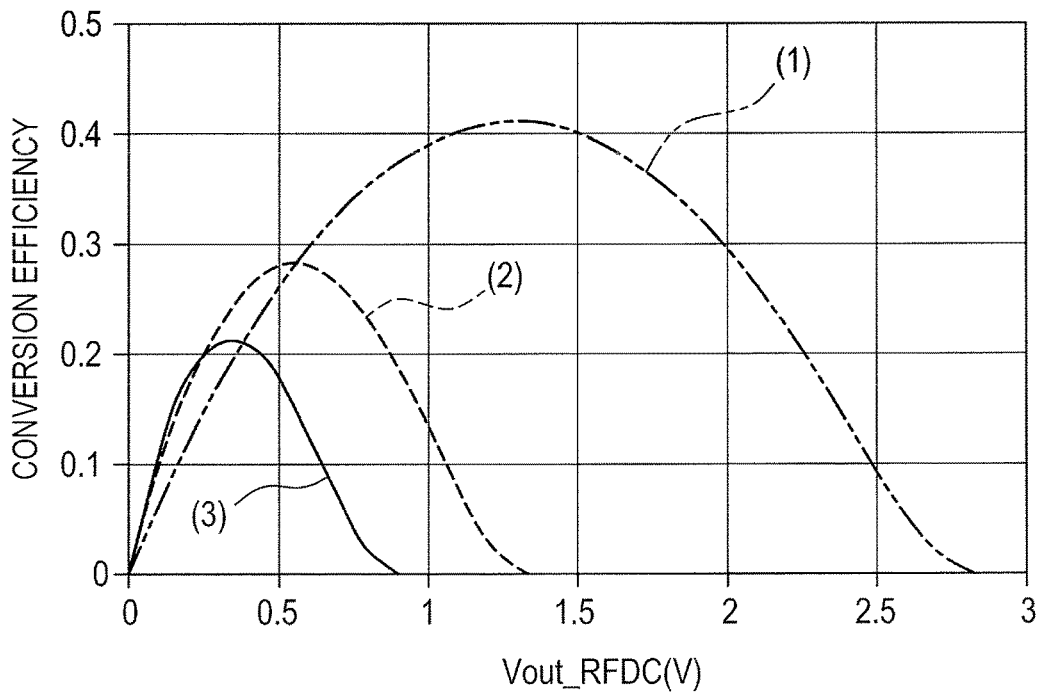
FIG. 3A is a graph illustrating a relationship between an output voltage and conversion efficiency with respect to different input voltages in an RF-DC circuit, and is a graph whose horizontal axis represents the output voltage.

FIG. 3A is a graph illustrating the above-described phenomenon, (1) represents a graph of input voltage Vin_RFDC=−4 dBm to RF-DC conversion circuit 3. (2) represents a graph of input voltage Vin_RFDC=−10 dBm to RF-DC conversion circuit 3, and (3) represents a graph of input voltage Vin_RFDC=−13 dBm to RF-DC conversion circuit 3. The horizontal axis represents output voltage Vout_RFDC(V) from RF-DC conversion circuit 3, and the vertical axis represents the conversion efficiency.

The input voltage often fluctuates in the order of magnitude (1) to (3). As a matter of course, output voltage Vout_RFDC also fluctuates in response to the fluctuations of input voltage Vin_RFDC. In response to the fluctuations of the input voltage, the output voltage at which the conversion efficiency is maximized also fluctuates.

In case (1), an output voltage which maximizes conversion efficiency is expressed by output voltage Vout_RFDC=approximately 1.3 V. In case (2), an output voltage which maximizes conversion efficiency is expressed by output voltage Vout_RFDC=approximately 0.5 V. In case (3), an output voltage which maximizes conversion efficiency is expressed by output voltage Vout_RFDC=approximately 0.3 V. A relationship between the input voltage and the output voltage which maximizes the conversion efficiency is nonlinear. In an environment where the input voltage violently fluctuates as in the energy harvest and the power to be used is limited, it is preferable that the output voltage of RF-DC conversion circuit 3 is controlled so as to maximize the conversion efficiency.

Figure 3B:
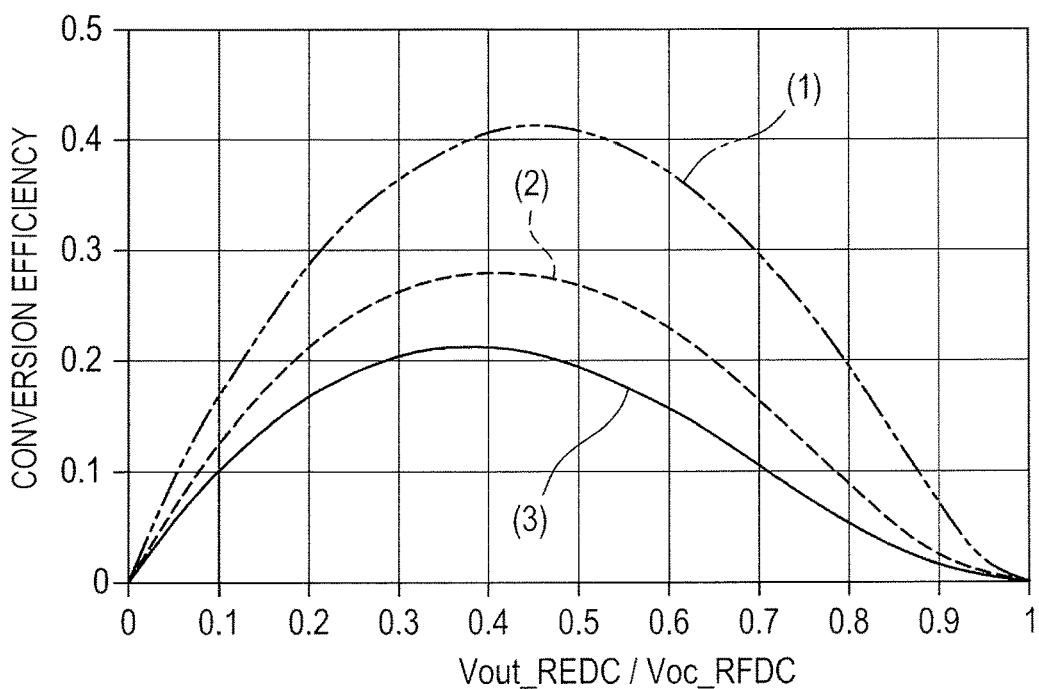
FIG. 3B is a graph illustrating a relationship between an output voltage and conversion efficiency with respect to different input voltages in the RF-DC circuit, and is a graph whose horizontal axis represents a value obtained in such a way that a main section voltage is divided by an open circuit voltage.

FIG. 3A illustrates the conversion efficiency in a case where the horizontal axis is set to Vout_RFDC. In cases (1), (2), and (3), when Vout_RFDC is not 0, a value of Vout_RFDC in which the conversion efficiency becomes 0 means open circuit voltage Voc_RFDC of RF-DC conversion circuit 3. Therefore, as illustrated in FIG. 3B, the present inventor found that regardless of input voltage Vin_RFDC, satisfactory conversion efficiency can be obtained in a case of a value close to a value obtained by dividing output voltage Vout_RFDC of RF-DC conversion circuit 3 by open circuit voltage Voc_RFDC.

That is, circuit design is employed as follows. When RF-DC conversion circuit 3 outputs predetermined output voltage Vout_RFDC, regardless of the input voltage, output voltage Vout_RFDC/open circuit voltage Voc_RFDC obtained by uniformly normalizing the output voltage with the open circuit voltage is set to a specifically preferable predetermined value. This design is introduced to energy harvest terminal 100 of the present disclosure, particularly to MPPT control circuit 10. Accordingly, regardless of the input voltage to RF-DC conversion circuit 3, RF-DC conversion circuit 3 can perform MPPT control so as to output the output voltage which allows the conversion efficiency to have the maximum value or to have a value close to the maximum value.

MPPT control circuit 10 is disposed on the output side of RF-DC conversion circuit 3. MPPT control circuit 10 has DC-DC converter 13 which converts the output of RF-DC conversion circuit 3 into a predetermined voltage suitable for various loads (MPU 23, sensor 40, and RFID transceiver 50) in the subsequent stage. Here, (when RF-DC conversion circuit 3 and DC-DC converter 13 are connected to each other) MPPT controller 15 performs feedback control on DC-DC converter 13 so that that input voltage Vin on the side where DC-DC converter 13 is connected to RF-DC conversion circuit 3 is equal to a predetermined target voltage. As a result of this control, impedance of DC-DC converter 13 is caused to fluctuate, and consequently, RF-DC conversion circuit 3 indirectly controls RF-DC conversion circuit 3 so as to output the optimum output voltage.

FIG. 4 is a block diagram illustrating details of MPPT control circuit 10 for performing the above-described control. As described above, MPPT control circuit 10 includes first switch 11, DC-DC converter 13, and MPPT controller (controller) 15. First switch 11 is disposed in series between RF-DC conversion circuit 3 and DC-DC converter 13, and connects (turns on) RF-DC conversion circuit 3 and DC-DC converter 13 to each other or disconnects (turns off) RF-DC conversion circuit 3 and DC-DC converter 13 from each other. As described above, DC-DC converter 13 converts the output of RF-DC conversion circuit 3 into a predetermined voltage suitable for various loads (MPU 23, sensor 40, RFID transceiver 50) in the subsequent stage.

MPPT controller 15 controls connection and disconnection between RF-DC conversion circuit 3 and DC-DC converter 13 by switching on or off first switch 11. MPPT controller 15 performs feedback control on DC-DC converter 13, based on output voltage Vout_RFDC of RF-DC conversion circuit 3. As illustrated in FIG. 4, MPPT controller 15 includes first timer 16, voltage dividing circuit 17, sixth switch 18, comparator 19, and sampling capacitor C3.

First timer 16 has a role of switching connection or disconnection (turning on or off) between first switch 11 and sixth switch 18 (to be described later) with predetermined timing and intervals. Voltage dividing circuit 17 acquires the output voltage of RF-DC conversion circuit 3, that is, open circuit voltage Voc_RFDC, which is obtained when first switch 11 is turned off, that is, when RF-DC conversion circuit 3 and DC-DC converter 13 are disconnected from each other. Open circuit voltage Voc_RFDC is input when viewed from MPPT controller 15 (and DC-DC converter 13). Accordingly, the voltage is expressed as open circuit voltage Vin_oc.

Furthermore, voltage dividing circuit 17 multiplies open circuit voltage Vin_oc by predetermined coefficient (divided voltage coefficient) $\alpha(0<\alpha<1)$ so as to acquire and output divided voltage $\alpha$Vin_oc. In other words, voltage dividing circuit 17 acquires and outputs predetermined divided voltage $\alpha$Vin_oc by dividing open circuit voltage Vin_oc. As will be described later, MPPT controller 15 performs feedback control on DC-DC converter 13 so that input voltage Vin of DC-DC converter 13 is equal to divided voltage $\alpha$Vin_oc here. In this manner, the output voltage when viewed from RF-DC conversion circuit 3 becomes divided voltage $\alpha$Vin_oc, and the output becomes a times open circuit voltage Vin_oc. This means to satisfy a relationship between the output voltage and the open circuit voltage so as to satisfy a relationship of output voltage Vout_RFDC/open circuit voltage Voc_RFDC as illustrated in FIG. 3B. RF-DC conversion circuit 3 is in a state of outputting the output voltage so that the conversion efficiency has the maximum value or a value close to the maximum value. Accordingly, divided voltage $\alpha$Vin_oc can be regarded as a target voltage.

Sixth switch 18 is disposed in series between voltage dividing circuit 17 and comparator 19 and sampling capacitor C3 (to be described later), connects voltage dividing circuit 17 and comparator 19 and sampling capacitor C3 to each other when sixth switch 18 is turned on, and disconnects voltage dividing circuit 17 and comparator 19 and sampling capacitor C3 from each other. Sixth switch 18 is configured to include a semiconductor switch such as a metal oxide semiconductor field effect transistor (MOSFET) 9, and has a role of blocking voltage dividing circuit 17 when sixth switch 18 is turned off, and a role of closing voltage dividing circuit 17 when sixth switch 18 is turned on, that is, when acquiring open circuit voltage Vin_oc.

Sampling capacitor C3 is charged with target voltage (divided voltage) αVin_oc which is the output of voltage dividing circuit 17, only when sixth switch 18 is turned on (connected). Comparator 19 compares input voltage Vin of DC-DC converter 13 and target voltage (divided voltage) αVin_oc, and outputs the difference therebetween to DC-DC converter 13, thereby performing feedback control on DC-DC converter 13. That is, MPPT controller 15 performs feedback control on DC-DC converter 13, based on the voltage of sampling capacitor C3.

Figure 5:
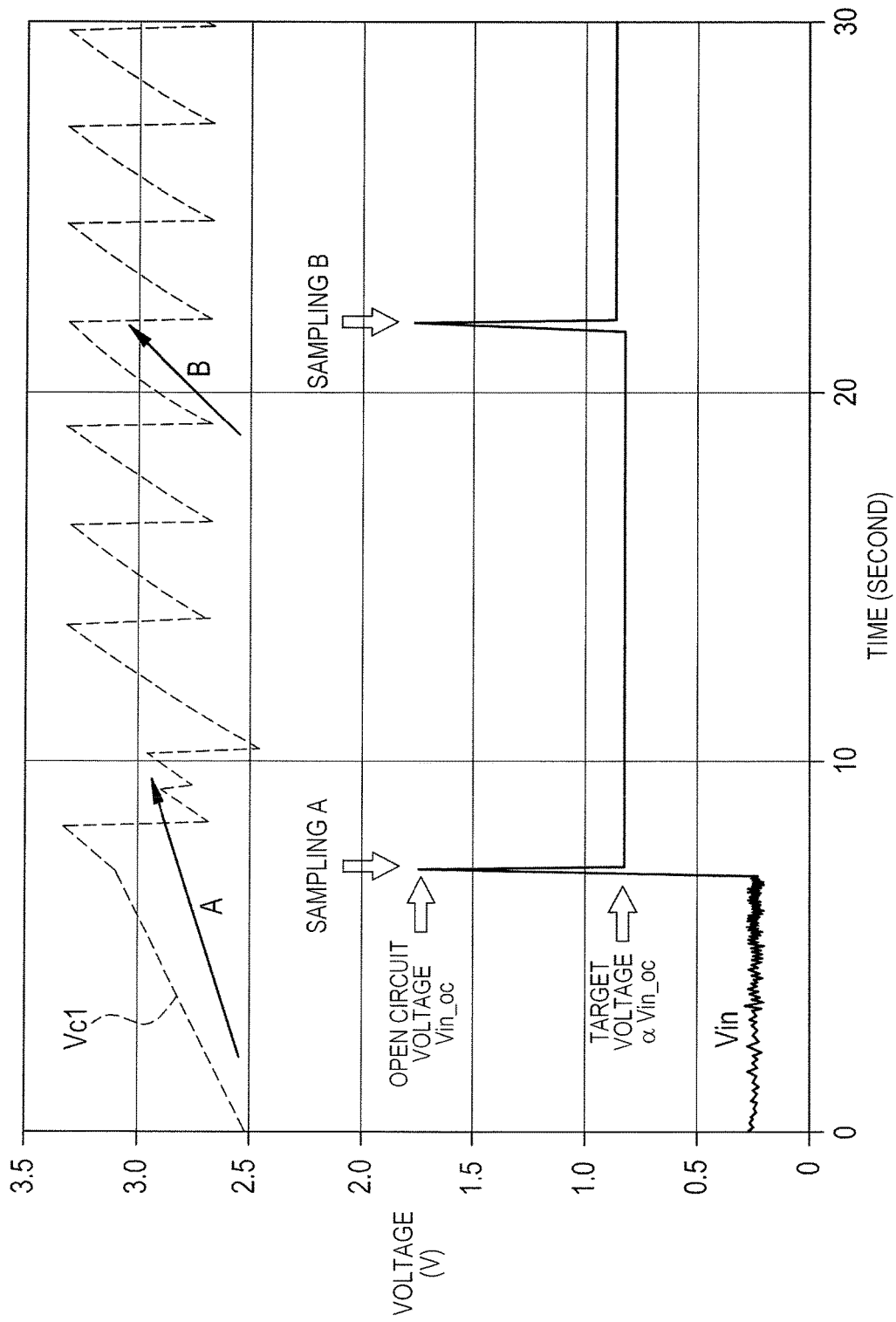
FIG. 5 is a chart illustrating each change in an input voltage of a DC-DC converter and a charging voltage of a first capacitor.

FIG. 5 is a chart illustrating a state where input voltage Vin of DC-DC converter 13 and charging voltage Vc1 of first capacitor C1 charged with output voltage Vout of DC-DC converter 13 under the control of MPPT controller 15 as described above are changed with the lapse of time. Initially, input voltage Vin has a low value, first timer 16 is operated, first switch 11 is opened (turned off) at timing of sampling A, and sixth switch 18 is connected (turned on), thereby obtaining open circuit voltage Vin_oc of approximately 1.75 V. In this state, RF-DC conversion circuit 3 is brought into an unloaded state for a short time, and open circuit voltage Vin_oc is divided so as to obtain target voltage (divided voltage) αVin_oc. Sampling capacitor C3 is charged with target voltage (divided voltage) αVin_oc.

Thereafter, first switch 11 is connected (turned on) at timing of sampling B, sixth switch 18 is opened (turned off), and voltage αVin_oc of the sampling capacitor is set to a target voltage, thereby performing feedback control on input voltage Vin of DC-DC converter 13. Here, an optimum value for coefficient α is selected, thereby enabling RF-DC conversion circuit 3 to be operated at a maximum power point regardless of input power Vin_RFDC. Coefficient α is a value depending on a configuration of RF-DC conversion circuit 3 and other factors, and can be handled as a predetermined constant for specific energy harvest terminal 100.

Referring to FIG. 5, it is also understood that charging voltage Vc1 of first capacitor C1 maintains a predetermined value. In this manner, it is possible to highly efficiently obtain power even in an environment where receivable power greatly fluctuates. First capacitor C1 is more quickly charged.

Figure 6:
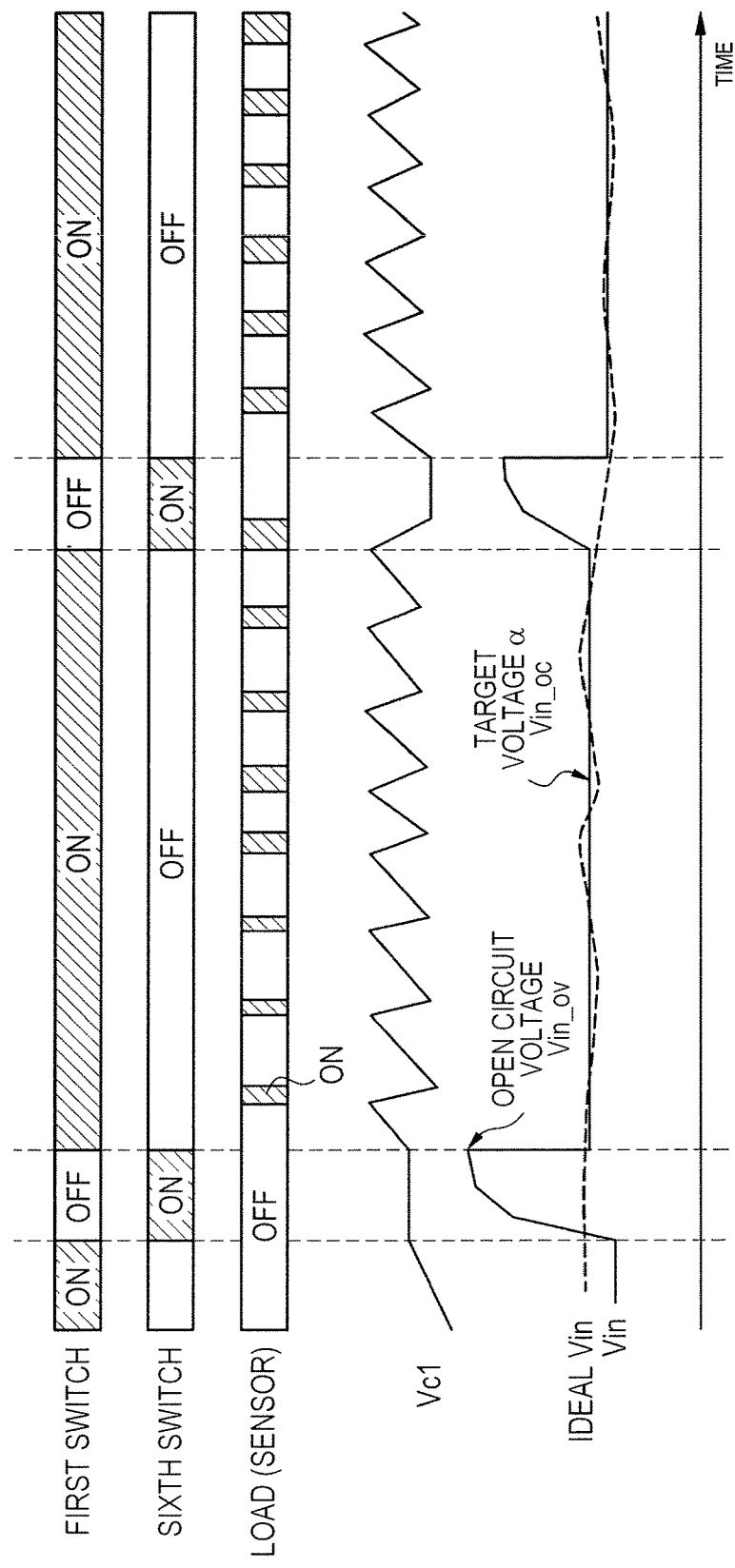
FIG. 6 is a timing chart of MPPT control.

FIG. 6 is a timing chart of MPPT control performed by MPPT control circuit 10. First switch 11 and sixth switch 18 are alternately turned on and off, and sixth switch 18 is intermittently turned on. In this manner, open circuit voltage Vin_oc is intermittently acquired in input voltage Vin. Feedback control is performed on DC-DC converter 13, thereby controlling the input voltage of DC-DC converter 13 to be target voltage (divided voltage) αVin_oc which follows an ideal input voltage indicated by a broken line. First capacitor C1 is charged with output voltage Vout of DC-DC converter 13. If charging voltage Vc1 reaches a prescribed value or greater, a load such as sensor 40 is turned on and driven. Thereafter, the charge of first capacitor C1 decreases. If charging voltage Vc1 falls to the prescribed value, the load is turned off. In response to this, charging voltage Vc1 rises again. Accordingly, charging voltage Vc1 repeatedly rises and falls within a prescribed range.

Sequence Starting Control

Next, sequence starting circuit 20 according to the exemplary embodiment will be described. In energy harvest terminal 100, first capacitor C1 corresponds to a power storage device serving as a power source. A leakage current of the capacitor is proportional to the capacitance of the capacitor. Accordingly, it is desirable that the capacity of the capacitor is as small as possible in the energy harvest terminal driven using limited power.

However, in a case where the capacitor having the small capacity is used as the power source, the capacitor is greatly influenced by the voltage drop based on an inrush current generated when starting a circuit block including the load (load block). That is, each load has a decoupling capacitor which reduces the influence of original noise. If all or a plurality of loads are caused to simultaneously start, due to the action of a large decoupling capacitor, the voltage drop of first capacitor C1 serving as the power source may reach a predetermined value or greater.

Figure 7:
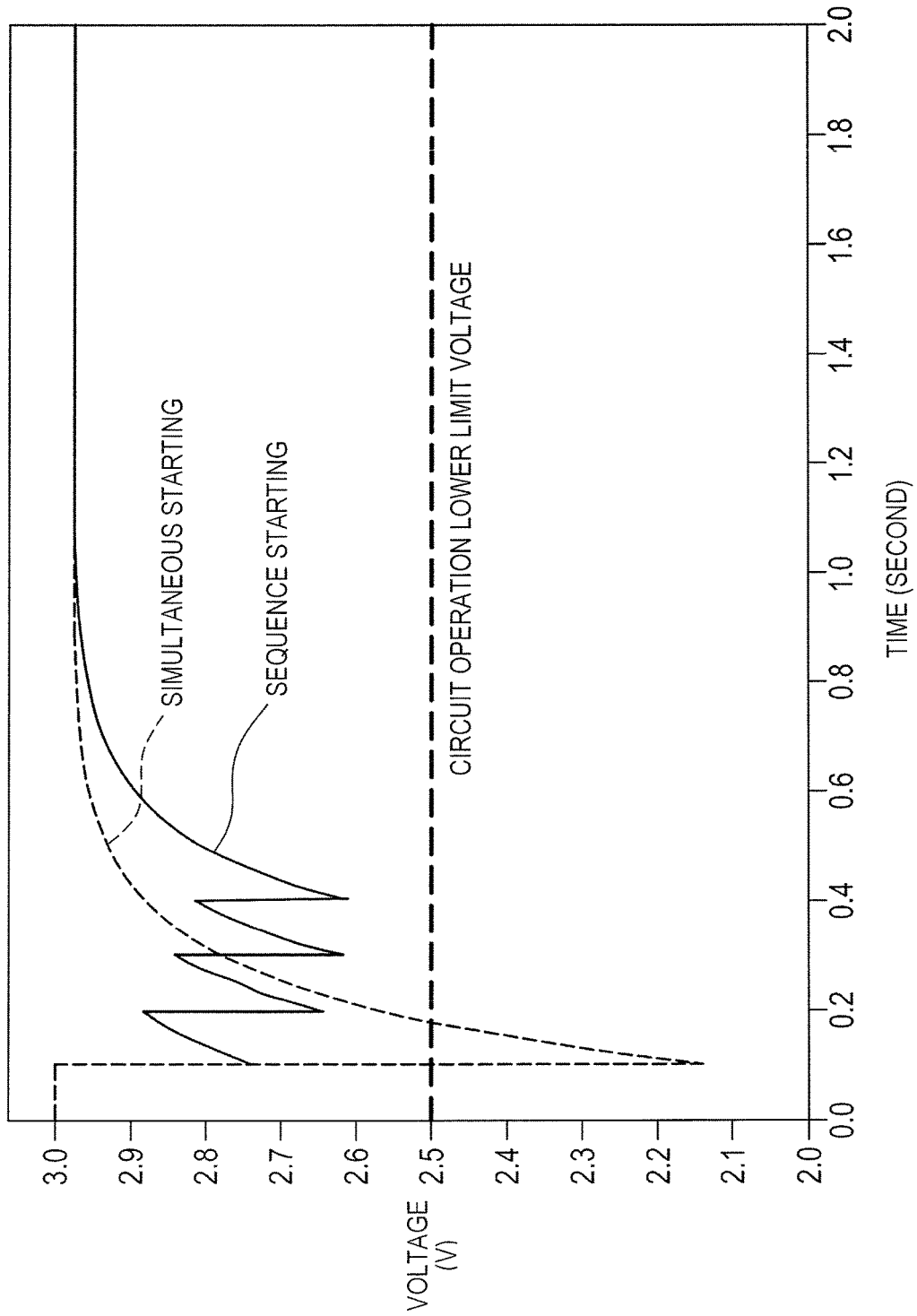
FIG. 7 is a graph illustrating a phenomenon of a voltage drop at the time of starting.

The graph indicated by the broken line in FIG. 7 illustrates the above-described phenomenon. All of the loads are caused to simultaneously start. In this manner, the charging voltage of first capacitor C1 abruptly decreases, and the charging voltage falls below the minimum circuit operation lower limit voltage (2.5 V in this example) which operates the overall circuit of energy harvest terminal 100. If this phenomenon occurs, there is a possibility that the operation of the energy harvest terminal may be stopped or the operation may be adversely affected. In a case where the load is directly connected to the capacitor, a low voltage not assumed for the load is applied to the load at an initial charging stage. Consequently, there is a possibility that the operation may become unstable or power loss may occur.

Therefore, in energy harvest terminal 100 according to the present exemplary embodiment, instead of causing a plurality of loads to simultaneously start, the plurality of loads are caused to start with a time difference (sequence starting). Accordingly, even in a case of using the capacitor having small capacity, the charging voltage is prevented from falling below the circuit operation lower limit voltage as illustrated by the solid line in FIG. 7. As a result, malfunction caused by the voltage drop is suppressed. Hereinafter, a specific configuration and operation for realizing the sequence starting will be described.

Figure 8:
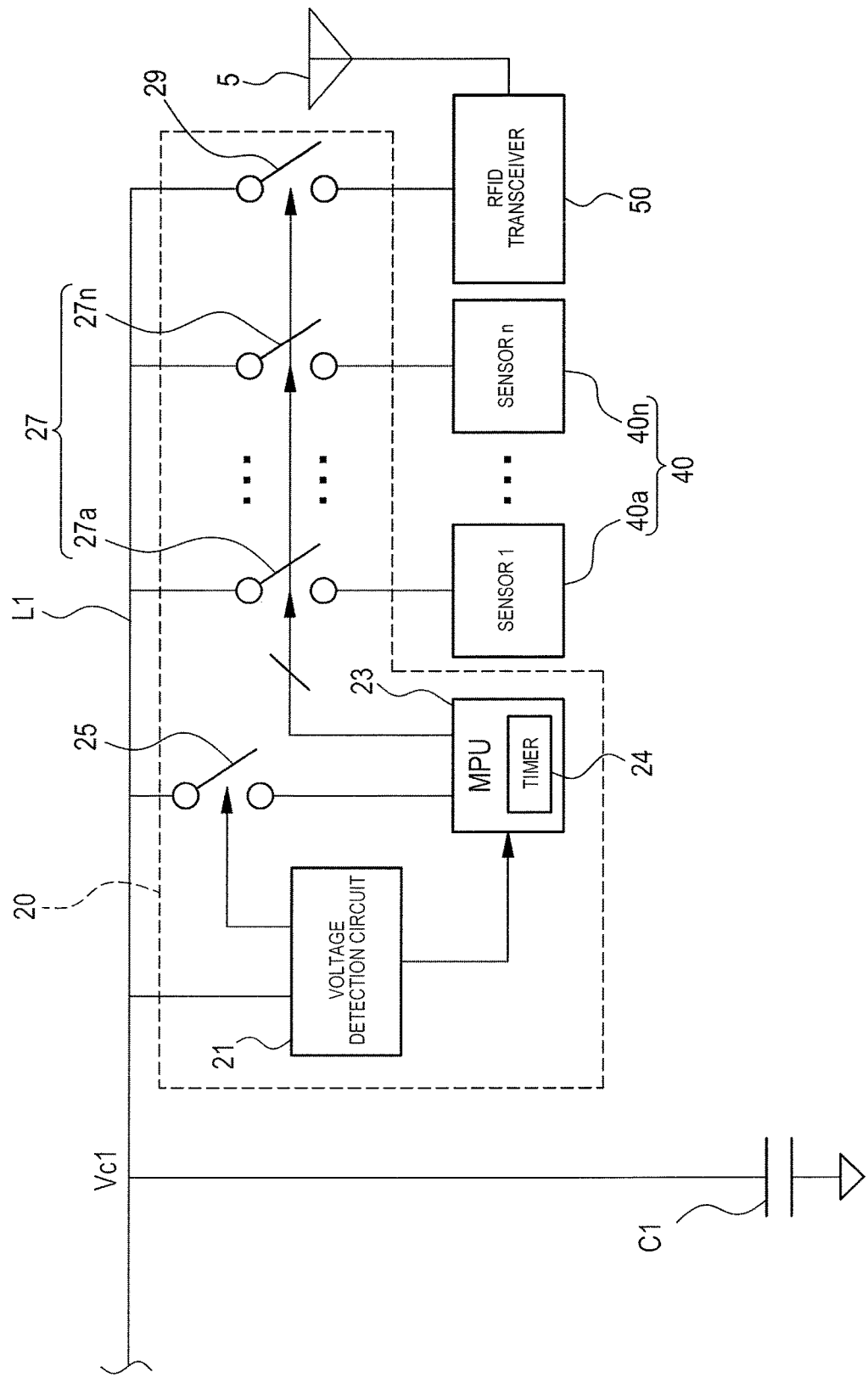
FIG. 8 is a block diagram illustrating a portion of a sequence starting circuit.

FIG. 8 is a block diagram illustrating sequence starting circuit 20 in FIG. 1, and a portion of the load including sensor 40 and RFID transceiver 50. Sequence starting circuit 20 includes voltage detection circuit 21, MPU 23, second switch 25, third switch 27, and fourth switch 29.

Voltage detection circuit 21 is connected to first capacitor (first power storage device) C1 serving as a power storage device (power source) via power source line L1. Voltage detection circuit 21 can detect a voltage (charging voltage Vc1) of first capacitor C1. Voltage detection circuit 21 has a hysteresis characteristic, in which an off-voltage for stopping power supply to the load is lower than an on-voltage for starting the load by supplying power to the load such as MPU 23 and sensor 40.

MPU 23, sensor 40, and RFID transceiver 50, which are the plurality of loads, are connected in parallel to power source line L1 via respective switches, and receive the power supplied from first capacitor C1.

MPU 23, which is one type of loads, is connected to power source line L1 via second switch 25, and includes timer 24 capable of counting elapsed time. MPU 23 is a microcomputer configured to include an arithmetic device capable of reading a program stored in a memory (not illustrated), and functions as a controller that controls the overall operation of energy harvest terminal 100. MPU 23 may be provided with a voltage detection function.

Sensor 40, which is one type of loads, is connected to power source line L1 via third switch 27. Sensor 40 is provided in accordance with a specific value of the external environment to be detected by energy harvest terminal 100. For example, sensor 40 is a temperature sensor in a case where the specific value of the external environment is temperature, and is a pressure sensor in a case where the specific value is pressure. In energy harvest terminal 100 according to the present exemplary embodiment, a plurality of sensors such as sensor 1 (40a), sensor 2, . . . , and sensor n (40n) are respectively connected to power source line L1 via third switch 27a, . . . , and third switch 27n.

RFID transceiver 50, which is one type of loads serving as a wireless transceiver, is connected to power source line L1 via fourth switch 29. RFID transceiver 50 is a device for transmitting a value acquired by sensor 40 to an external RFID communication node. In the present exemplary embodiment, voltage detection circuit 21 detects that the charging voltage of first capacitor C1 reaches a predetermined threshold voltage. When performing the detection, voltage detection circuit 21 turns on second switch 25 of MPU 23 serving as a first load in the plurality of loads, thereby starting MPU 23. Voltage detection circuit 21 can be stably operated, even if the charging of first capacitor C1 is not sufficient and the charging voltage is low. After voltage detection circuit 21 detects a voltage sufficiently higher than the lowest starting voltage of MPU 23, second switch 25 of MPU 23 is turned on, and the power source is supplied thereto. Since MPU 23 can obtain the sufficient voltage, starting is rapidly completed.

Thereafter, MPU 23 sequentially turns on sensor 40, third switch 27, and fourth switch 29 of RFID transceiver 50, which are loads other than MPU 23, and sequentially starts all of these. In this sequence starting, MPU 23 causes timer 24 to count the elapsed time after turning on the respective switches. The elapsed time to be counted is a time needed until the charging voltage of first capacitor C1 reaches a predetermined value required for stably driving the load. If the counted time reaches the predetermined elapsed time, MPU 23 turns on each switch of other loads (sensor 40 and RFID transceiver 50) so as to start other loads. Through this sequence starting, charging voltage drop of first capacitor C1 is temporally dispersed. Accordingly, the capacity of first capacitor C1 can be reduced. This can realize higher efficiency and higher starting speed.

Figure 9:
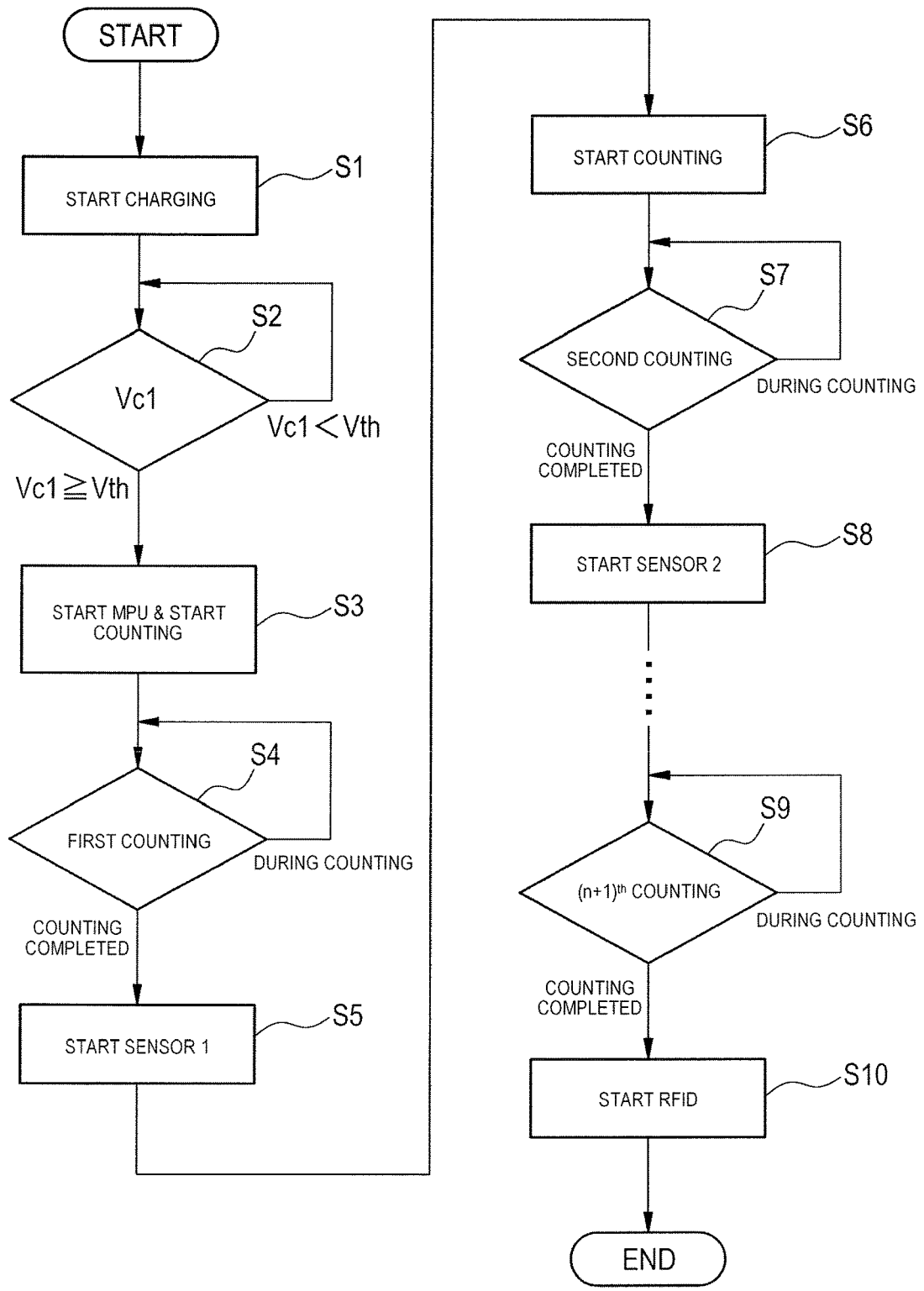
FIG. 9 is a flowchart illustrating a process procedure of sequence starting control.

FIG. 9 is a flowchart illustrating a process procedure of the above-described sequence starting. All switches are opened (turned off) before the process starts and until voltage detection circuit 21 detects predetermined threshold voltage Vth, and first capacitor C1 starts to be charged with output voltage Vout of DC-DC converter 13 at any desired timing (Step S1). If first capacitor C1 is brought into a state of charging voltage Vc1 threshold voltage Vth (Step S2), voltage detection circuit 21 supplies power to (turns on) second switch 25 of MPU 23, and MPU 23 causes timer 24 to start the counting (Step S3). If first counting of the timer completely reaches a preset elapsed time (Step S4), MPU 23 closes (turns on) third switch 27a of sensor 1 (40a) serving as one of loads, and starts sensor 1 (40a) (Step S5).

Thereafter, if timer 24 starts the counting again (Step S6) and second counting of the timer completely reaches a preset elapsed time (Step S7), MPU 23 closes (turns on) third switch 27 of sensor 2 serving as one of loads, and starts sensor 2 (Step S8).

Thereafter, the same process is repeatedly performed. After starting the sensors up to sensor n (40n), if the (n+1)$^{th}$ counting of the timer finally and completely reaches the preset elapsed time (Step S9), MPU 23 closes (turns on) fourth switch 29 of RFID transceiver 50 serving as one of loads, and start RFID transceiver 50 (Step S10).

In the flowchart in FIG. 9, a procedure of comparing charging voltage Vc1 of first capacitor C1 and threshold voltage Vth with each other is performed only in an initial stage. It is not determined whether or not charging voltage Vc1 satisfies a sufficient voltage for starting the load. Therefore, voltage detection circuit 21 may perform a process so as to start the load only in a state where a condition in Step S2 is satisfied. For example, after step S2, voltage detection circuit 21 outputs a trigger signal for starting the load to MPU 23. Before starting other loads, voltage detection circuit 21 performs the comparison in Step S2, and outputs a similar trigger signal to MPU 23 when first capacitor C1 is in a state where charging voltage Vc1 threshold voltage Vth is satisfied. Every time this trigger signal is input to MPU 23, MPU 23 may sequentially turn on each switch of other loads subsequent to sensor 1 in accordance with the sequence stored in MPU 23, thereby sequentially starting other loads. Threshold voltage Vth at this time may have a value different from a value of initial threshold voltage Vth.

Charging Control

Next, capacitor charging circuit 30 according to the exemplary embodiment will be described. In the above-described sequence starting control, it is assumed that the capacity of the power storage device (first capacitor C1 in the above-described example) serving as the power source is small. However, in order to ensure a stable operation of energy harvest terminal 100, it is desirable that energy harvest terminal 100 includes a chargeable power storage device having large capacity. In particular, in view of wireless communication, a sensor with high power consumption, or output device driving, it is necessary to provide a power storage device having sufficient capacity. A sufficient amount of power energy is stored using the power storage device having large capacity. In this manner, it is possible to compensate for memory backup or a load operation in an environment where power cannot be obtained.

However, if the power storage device having large capacity is directly connected to the power source line, after the device is discharged, the voltage gently rises at the time of charging, and it takes time to charge the device. Consequently, a problem arises in that it is not possible to start the load including the sensor during the charging time (prolonged starting time). For example, in a case where the DC-DC converter is of a type which is less efficiently operated when the DC-DC converter and highly efficiently operated after the sufficient voltage is obtained, the less efficiently operated time is extended, thereby causing the energy harvest terminal to be less efficiently operated.

Therefore, in energy harvest terminal 100 according to the present exemplary embodiment, a plurality (at least two) of power storage devices having mutually different capacities are provided, and the charging control is performed in order to control the timing for charging each power storage device. In this manner, prompt starting is realized, and a highly efficient operation is realized. Hereinafter, a specific configuration and operation for realizing the charging control will be described.

Figure 10:
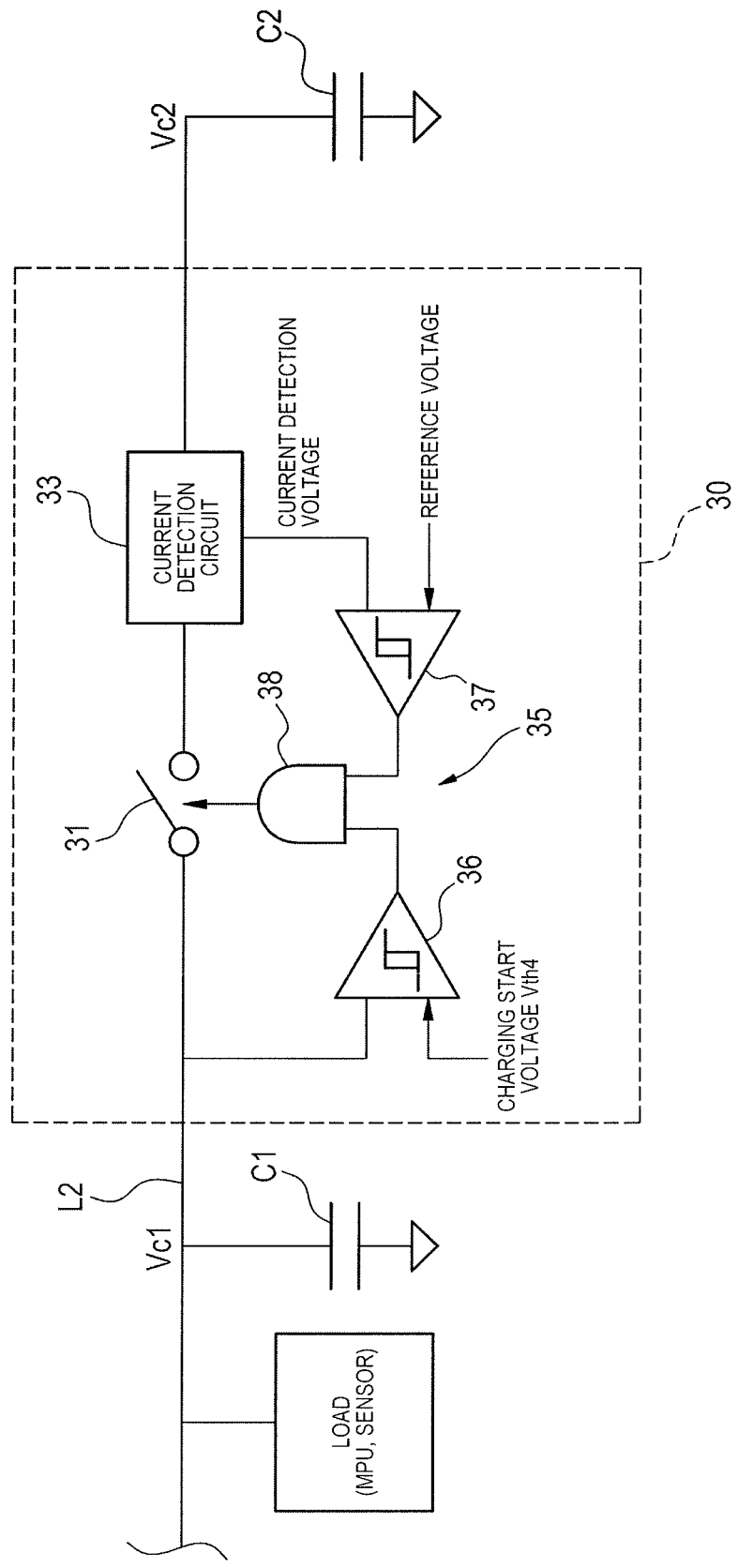
FIG. 10 is a block diagram illustrating details of a capacitor charging circuit.

FIG. 10 is a block diagram illustrating details of capacitor charging circuit 30 in FIG. 1. Capacitor charging circuit 30 includes fifth switch 31, current detection circuit 33, and switching regulator 35. Fifth switch 31 is disposed on connection line L2 for connecting first capacitor C1 (and power source line L1) serving as the power storage device and second capacitor C2 (to be described later) to each other. Fifth switch 31 functions as a current limiter that opens or closes connection line L2, and which limits a current flowing in second capacitor C2 (to be described later). Current detection circuit 33 is disposed in connection line L2 in the rear stage of fifth switch 31, detects a current flowing from first capacitor C1 to second capacitor C2, and outputs a voltage corresponding to the current.

As illustrated in FIG. 10, switching regulator 35 includes first comparator 36, second comparator 37, and AND circuit 38. Switching regulator 35 detects an output voltage of current detection circuit 33, and performs a switching operation of fifth switch 31 (current limiter) so that the output voltage is equal to a predetermined reference voltage.

First comparator 36 compares input charging voltage Vc1 of first capacitor C1 with charging start voltage Vth4 serving as a threshold value for determining whether to start charging second capacitor C2, and outputs a difference between both of these. Second comparator 37 compares a current detection voltage which is the output voltage of current detection circuit 33 with a predetermined reference voltage serving as a threshold value, and outputs a difference between both of these. AND circuit 38 outputs a logical product of first comparator 36 and second comparator 37. An operation of switching regulator 35 will be described later in detail.

Energy harvest terminal 100 according to the present exemplary embodiment includes second capacitor (second power storage device) C2 serving as a power storage device connected to current detection circuit 33 of capacitor charging circuit 30. The power capacity of second capacitor C2 is larger than the power capacity of first capacitor C1. For example, another chargeable power storage device such as a lithium ion battery can be employed instead of the second capacitor.

In the present exemplary embodiment, following four threshold voltages Vth1, Vth2, Vth3, and Vth4 are set for charging voltage Vc1 of first capacitor C1 and charging voltage Vc2 of second capacitor C2 (Vth4>Vth3≥Vth2>Vth1). Particularly, while observing a magnitude relationship of charging voltage Vc1, charging voltage Vc2, and threshold voltages Vth1, Vth2, Vth3, and Vth4, first comparator 36 and second comparator 37 of switching regulator 35 perform charging control on first capacitor C1 and second capacitor C2.

Vth1: threshold voltage for stopping power supply to the loads (MPU 23 and sensor 40) when the voltage falls
Vth2: threshold voltage for starting power supply to the loads when the voltage rises
Vth3: charging stop voltage serving as the threshold voltage for stopping charging second capacitor C2 when the voltage falls
Vth4: charging start voltage (refer to FIG. 11) serving as the threshold voltage for starting charging second capacitor C2 when the voltage rises First, first capacitor C1 having the smaller power capacity is charged with output voltage Vout of DC-DC converter 13, and charging voltage Vc1 thereof rises. If charging voltage Vc1 exceeds threshold voltage Vth2 higher than threshold voltage Vth1 in which charging voltage Vc1 is lowest, first capacitor C1 and the load are connected to each other, and power starts to be supplied to the load. In a case where the power consumed by the load is more than the input power, charging voltage Vc1 drops. If charging voltage Vc1 drops to threshold voltage Vth1 or lower again, first capacitor C1 and the load are disconnected from each other. This operation is performed by voltage detection circuit 21.

In a case where the power input from first capacitor C1 is higher than the power consumed by the load, charging voltage Vc1 rises even after exceeding the threshold voltage Vth1. If charging voltage Vc1 exceeds threshold voltage Vth3 and further threshold voltage (charging start voltage) Vth4 (Vc1>Vth4), first comparator 36 compares charging voltage Vc1 and charging start voltage Vth4 with each other, and outputs an on-signal (when a difference of Vc1−Vth4 is positive).

On the other hand, second comparator 37 compares a current detection voltage serving as the output voltage of current detection circuit 33 with a predetermined reference voltage serving as the threshold value, and outputs a difference between both of these. The current detection voltage is obtained by converting the current for charging second capacitor C2 into a voltage. The voltage rises as the current increases. The reference voltage is optionally adjusted and set in advance in accordance with the input power and the power capacity of second capacitor C2. The current for charging second capacitor C2 is controlled in accordance with the reference voltage. Here, since fifth switch 31 is opened, no current flows in current detection circuit 33. Therefore, a difference (between the current detection voltage and the reference voltage) is negative. At this time, second comparator 37 outputs the on-signal.

Since both the output of first comparator 36 and the output of second comparator 37 are in an on-state, and AND circuit 38 outputs the logical product of first comparator 36 and second comparator 37. Accordingly, the on-signal is output to fifth switch 31. Therefore, fifth switch 31 serving as the current limiter is closed, and first capacitor C1 and second capacitor C2 are connected to each other. The current flows from first capacitor C1 to second capacitor C2, and power is supplied to second capacitor C2. In this manner, second capacitor C2 starts to be charged with the power.

The power is supplied to second capacitor C2, and the charging is progressively performed. If the current detection voltage serving as the output voltage of the current detection circuit which increases in accordance with the charging current of second capacitor C2 exceeds the reference voltage, the difference (between the current detection voltage and the reference voltage) becomes positive, and second comparator 37 outputs an off-signal at this time. At this time, although the output of first comparator 36 is in an on-state, the output of second comparator 37 is in an off-state. AND circuit 38 outputs the logical product of first comparator 36 and second comparator 37. Accordingly, the off-signal is output to fifth switch 31. Therefore, fifth switch 31 serving as the current limiter is opened, and the connection line of first capacitor C1 and second capacitor C2 is opened. The current supply and the power supply from first capacitor C1 to second capacitor C2, and power are stopped.

In this situation, it is expected that charging voltage Vc1 of first capacitor C1 is higher than charging voltage Vc2 of second capacitor C2. However, current detection circuit 33 and second comparator 37 form a negative feedback loop. Accordingly, fifth switch 31 serving as the current limiter is repeatedly opened and closed. In this manner, a time average value of the current flowing from second capacitor C2 to first capacitor C1 is controlled to be a constant value.

The power consumed by the load increases, and charging voltage Vc1 of first capacitor C1 falls below threshold voltage (charging start voltage) Vth4 (Vc1<Vth4). In this case, if first comparator 36 is an ordinary comparator, first comparator 36 outputs the off-signal. Accordingly, fifth switch 31 serving as the current limiter is opened. However, in the present exemplary embodiment, first comparator 36 is configured to include a hysteresis comparator. If charging voltage Vc1 exceeds threshold voltage (charging stop voltage) Vth3 once and further exceeds threshold voltage (charging start voltage) Vth4, a variation amount (Vth4−Vth3) of the voltage is stored as hysteresis. Therefore, even if charging voltage Vc1 of first capacitor C1 falls below threshold voltage (charging start voltage) Vth4, the on-signal is output until charging voltage Vc1 falls below threshold voltage (charging stop voltage) Vth3. If charging voltage Vc1 of first capacitor C1 further falls below threshold voltage (charging stop voltage) Vth3 lower than threshold voltage (charging start voltage) Vth4 (Vc1<Vth3), first comparator 36 outputs the off-signal. In this case, regardless of the output of second comparator 37, fifth switch 31 serving as the current limiter is opened. First capacitor C1 and second capacitor C2 are disconnected from each other. The power supply from first capacitor C1 to second capacitor C2 and the charging are stopped. As described above, first comparator 36 has the hysteresis characteristic. In specific threshold voltages Vth3 and Vth4, the operation of fifth switch 31 varies between when charging voltage Vc1 rises and when charging voltage Vc1 drops. Table 1 below shows the hysteresis in threshold voltages Vth1 and Vth2 held by voltage detection circuit 21 and the hysteresis in threshold voltages (charging start voltage and charging stop voltage) Vth3 and Vth4 held by first comparator 36.

TABLE 1

| When threshold voltage Vc1 rises | | | |
|---|---|---|---|
| Vth1→ → No operation | Vth2→ → Start power supply to load | Vth3→ → No operation | Vth4→ → Start charging second capacitor C2 |
| When threshold voltage Vc1 drops | | | |
| ← ←Vth1 Stop power supply to load | ← ←Vth2 No operation | ← ←Vth3 Stop charging second capacitor C2 | ← ←Vth4 No operation |

As a result, switching regulator 35 detects the charging start voltage serving as the output voltage of current detection circuit 33 by using fifth switch 31, and performs the switching operation of fifth switch 31 so that the charging start voltage is equal to the predetermined reference voltage. Accordingly, fifth switch 31 functions as the current limiter that limits the current. Fifth switch 31 also functions as a switch for switching power supply from second capacitor C2 to the load or stopping the power supply.

Figure 11:
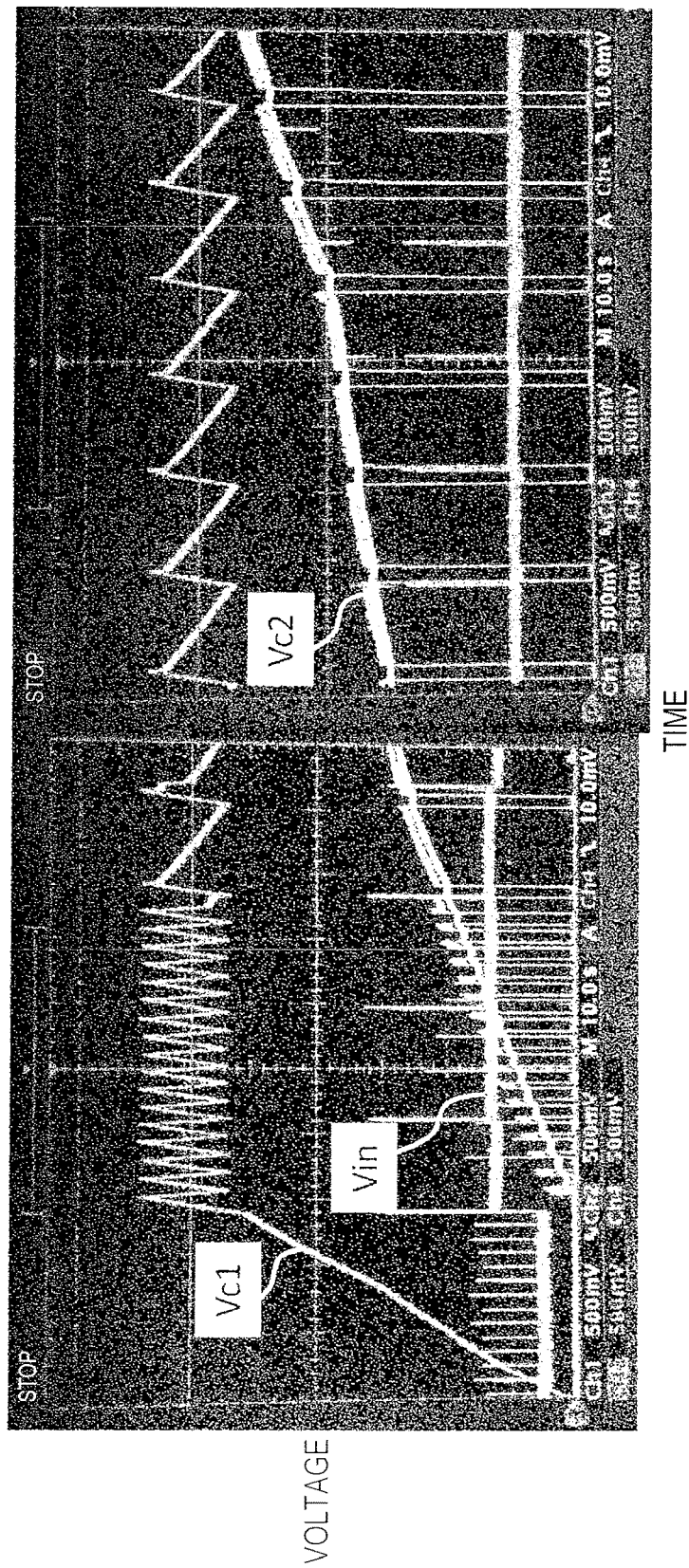
FIG. 11 is a graph illustrating experiment results obtained by monitoring a charging voltage of a first capacitor and a charging voltage of a second capacitor in a case where predetermined power is input to the capacitor charging circuit.

FIG. 11 is a graph illustrating test results obtained by monitoring charging voltage Vc1 of first capacitor C1 and charging voltage Vc2 of second capacitor C2 in a case where predetermined power is input to capacitor charging circuit 30 in FIG. 10. Input voltage Vin is input to a side connected to RF-DC conversion circuit 3 in DC-DC converter 13. It is understood that charging voltage Vc1 equal to output voltage Vout of DC-DC converter 13 rapidly rises and charging voltage Vc2 linearly increases. Linearly increasing charging voltage Vc2 means that second capacitor C2 is charged with a constant current.

Figure 12:
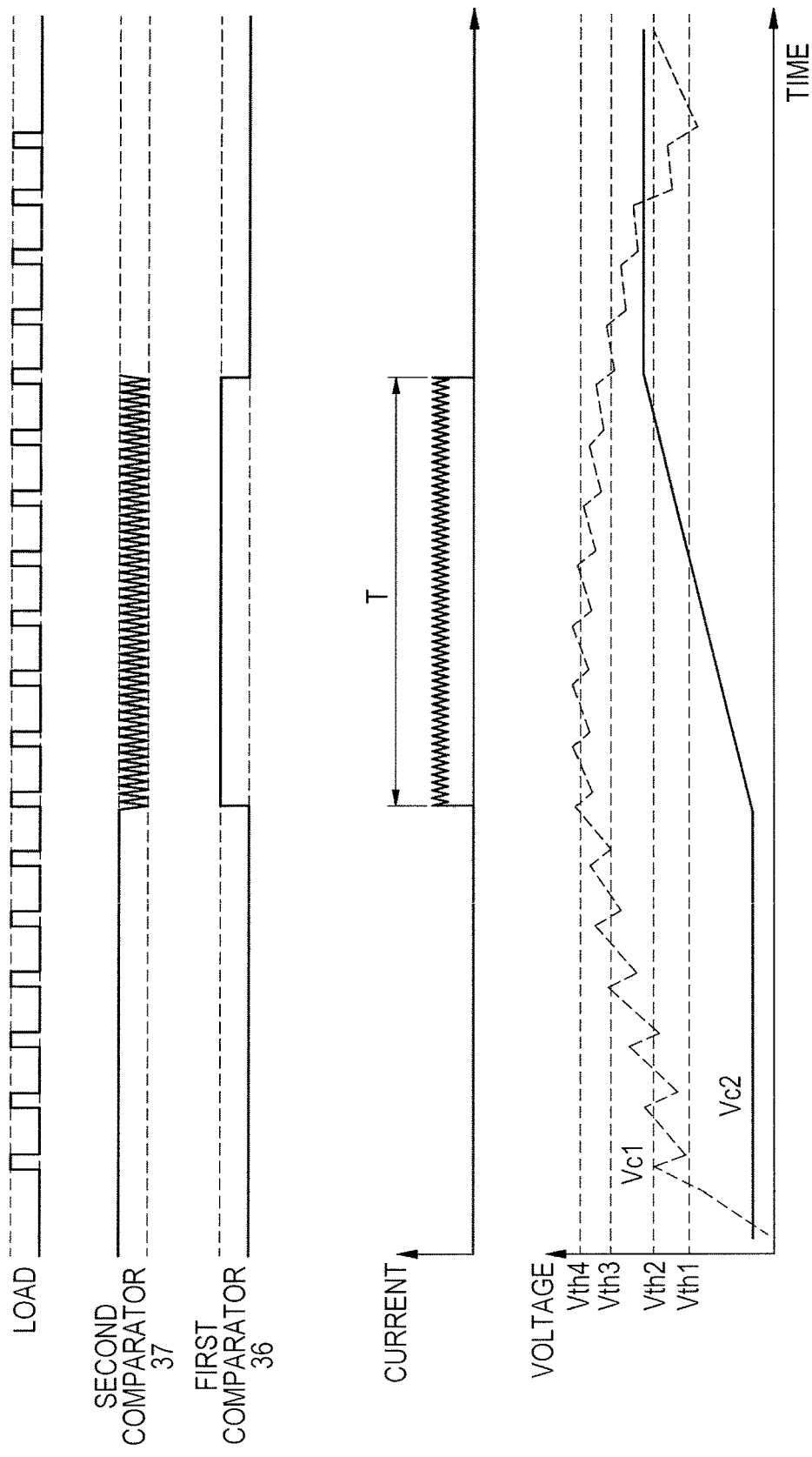
FIG. 12 is a timing chart of charging control.

FIG. 12 is a timing chart of charging control. FIG. 12 illustrates that if charging voltage Vc1 of first capacitor C1 exceeds charging start voltage Vth4 (Vc1>Vth4), capacitor charging circuit 30 starts charging second capacitor C2 with a constant current. As illustrated in section T, the charging is performed until charging voltage Vc1 of first capacitor C1 falls below charging stop voltage Vth3 (Vc1<Vth3). Therefore, according to the charging control of the exemplary embodiment, the charging is performed using the constant current. In this manner, the charging can be highly efficiently performed from first capacitor C1 having small capacity to second capacitor C2 having large capacity. Even in a case where first capacitor C1 and second capacitor C2 are completely discharged, the operation can be resumed in a short time. When both of these are completely discharged, the charging starts from first capacitor C1 having small capacity. Therefore, the time needed until a sufficient voltage for supplying power to the load is shortened.

Power Estimation Method

Next, a power estimation method performed by voltage detection circuit 21 and MPU 23 according to the exemplary embodiment will be described.

In the energy harvest terminal driven by the energy harvest, it is assumed that the energy obtained as a driving power source such as wireless power is continuously changed depending on external circumstances. Therefore, it is desirable to adaptively change the operation in accordance with the obtained power. For example, it is conceivable to change an interval of intermittent operations, the number and type of sensors 40 to be driven, the resolution of sensing performed by sensor 40, or an interval and method of communication.

The power amount is generally measured by calculating the power after measuring the current or the voltage by using an AD converter. However, it is not desirable to use the AD converter for the energy harvest terminal which needs relatively more power consumption and has limited usable power.

Figure 13:
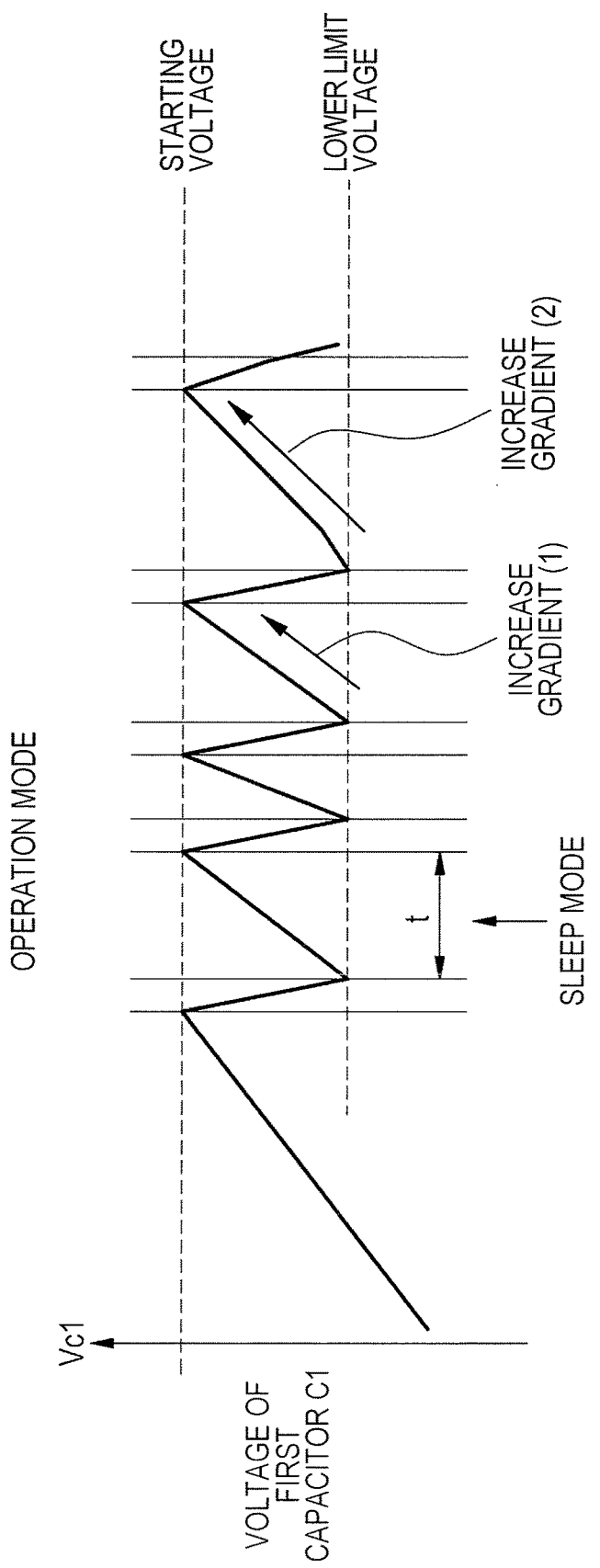
FIG. 13 is a graph illustrating a change in the charging voltage of the first capacitor.

Generally, in a system equipped with a microcomputer such as MPU 23, the system is equipped with a voltage detection circuit for resetting the system in a case where the voltage of the power source is in a prescribed or lower level. The energy harvest terminal 100 is also equipped with voltage detection circuit 21. Therefore, as illustrated in FIG. 13, in the present exemplary embodiment, predetermined starting voltage Vwakeup is determined in advance which is higher than the reset voltage for resetting energy harvest terminal 100 and lower than the upper limit voltage for driving energy harvest terminal 100. If voltage detection circuit 21 detects that charging voltage Vc1 of first capacitor C1 reaches starting voltage Vwakeup, MPU 23 operates the load, and enters an operation mode to be controlled. The load is operated, and charging voltage Vc1 of first capacitor C1 decreases. If charging voltage Vc1 falls below a predetermined lower limit voltage, MPU 23 proceeds to a sleep mode from the operation mode, and stops the operation of the load.

In the sleep mode, the load is not operated. Accordingly, the power is not consumed, and charging voltage Vc1 of first capacitor C1 is caused to increase by the externally obtained power. If voltage detection circuit 21 detects that charging voltage Vc1 of first capacitor C1 reaches starting voltage Vwakeup again, MPU 23 enters the operation mode for controlling the load again.

In the sleep mode, timer 24 (refer to FIG. 8) of MPU 23 counts the sleep time which is the time in the sleep mode. Based on the sleep time and starting voltage Vwakeup, MPU 23 can calculate the charging power of first capacitor C1 in the sleep mode.

That is, timer 24 of MPU 23 counts detection interval t during which starting voltage Vwakeup is detected. In the sleep mode, charging voltage Vc1 of first capacitor C1 increases. However, an increase gradient thereof (refer to FIG. 13) depends on the power externally obtained by the energy harvest. As the increase gradient increases, the externally obtained power increases. Charging voltage Vc1 reaches starting voltage Vwakeup in a short time. In an example in FIG. 13, increase gradient (1) is greater than increase gradient (2), and the detection interval in increase gradient (1) is shorter than detection interval in increase gradient (2).

MPU 23 can calculate the power from the increase gradient. Based on the calculated charging power, MPU 23 controls at least one of the number of loads, a type of loads, and a mode of loads, for example, which are to be driven in the subsequent operation mode.

Voltage detection circuit 21 detects that charging voltage Vc1 of first capacitor C1 exceeds first threshold voltage Vhigh, and detects that charging voltage Vc1 falls below second threshold voltage Vlow lower than first threshold voltage Vhigh. Voltage detection circuit 21 has a hysteresis characteristic.

Figure 14:
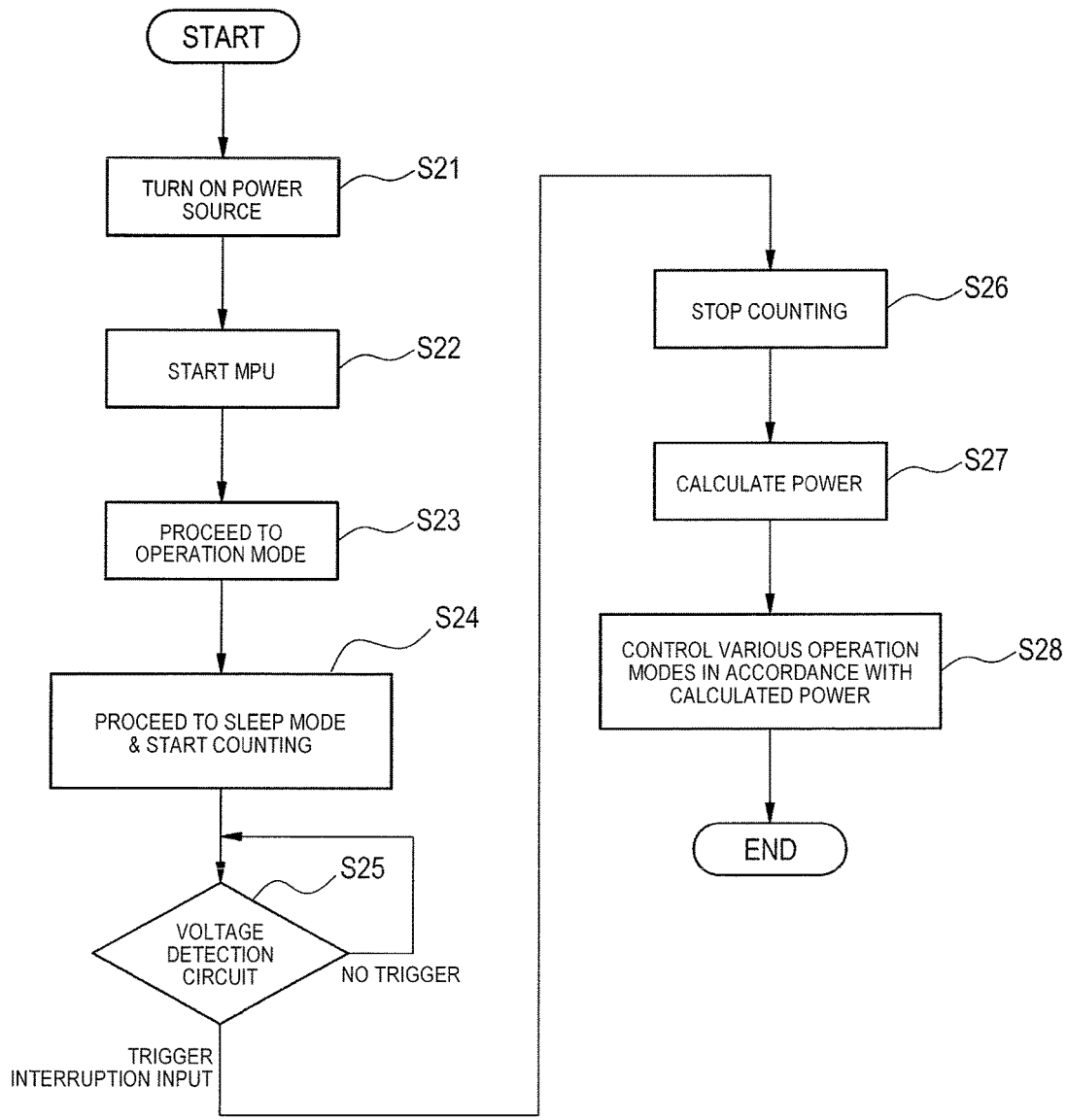
FIG. 14 is a flowchart illustrating a process procedure of a power estimation method.

FIG. 14 is a flowchart illustrating a process procedure of the power estimation method. The power source of energy harvest terminal 100 is turned on (Step S21). MPU 23 is started (Step S22), and proceeds to the operation mode (Step S23). Thereafter, if charging voltage Vc1 decreases and reaches the lower limit voltage, MPU 23 proceeds to the sleep mode, and timer 24 starts the counting (Step S24). In the sleep mode, if voltage detection circuit 21 detects charging voltage Vc1=starting voltage Vwakeup, a trigger signal is input to MPU (Step S25). MPU 23 causes timer 24 to stop the counting (Step S26). MPU 23 calculates and estimates the externally obtained power, based on the counting of timer 24 (t in FIG. 13) (Step S27). MPU 23 controls the operation mode such as the number of loads to be driven, the type of loads, and the mode of loads, in accordance with the calculated power. In this manner, energy harvest terminal 100 can calculate, that is, can estimate the externally obtained power, and can be operated in the optimum operation mode in accordance with this estimation.

In the present exemplary embodiment, MPU 23 functions as a controller that controls the overall operation of energy harvest terminal 100. MPU 23 mainly performs sequence starting control and charging control, and performs calculation using a power estimation method. Instead of MPPT controller 15, MPU 23 may perform MPPT control. In this way, the controller for performing various processes or calculations can be realized by an optionally provided arithmetic device.

As the load, energy harvest terminal 100 may drive a display or a speaker instead of sensor 40, in some cases. Various capacitors serving as the power storage device in the exemplary embodiment can be replaced with rechargeable secondary batteries such as lithium ion batteries.

Various switches in the exemplary embodiment are generally realized by semiconductor elements such as MOSFET. The switch is typically a high side switch on power source VDD side, but the switch may be a low side switch on ground GND side. In this case, an Nch-MOSFET can be used. Accordingly, this configuration contributes to further reduced power consumption.

Hitherto, the exemplary embodiments of the energy harvest terminal according to the present disclosure has been described with reference to the drawings. However, the present disclosure is not limited to the examples. Those skilled in the art will appreciate that various modifications, corrections, substitutions, additions, deletions, and equivalents can be conceived within the scope described in claims. As a matter of course, it is to be understood that all of these belong to the technical scope of the present disclosure.

According to the present disclosure, the present disclosure contributes to the use of highly efficient wireless power of the energy harvest terminal. Therefore, the use of the energy harvest terminal is further promoted.

What is claimed is:

1. A terminal comprising:
    an RF-DC conversion circuit that outputs a DC current by converting an AC current received via wireless communication into the DC current;
    a DC-DC converter that is connected to an output side of the RF-DC conversion circuit so as to convert a voltage of the DC current output from the RF-DC conversion circuit to a predetermined voltage;
    a controller that controls connection and disconnection between the RF-DC conversion circuit and the DC-DC converter;
    a first power storage device configured to include a capacitor and charged with an output voltage of the DC-DC converter;
    a second power storage device that has larger power capacity than the first power storage device;
    a load to which power is supplied from the first power storage device and the second power storage device;
    a voltage detection circuit that is disposed in a power source line connecting the first power storage device and the load to each other, that detects a charging voltage of the first power storage device, and that compares the charging voltage and a predetermined threshold voltage with each other so as to open and close the power source line;
    a current limiter that is disposed in a connection line connecting the first power storage device and the second power storage device to each other so as to open and close the connection line;
    a current detection circuit that is disposed in the connection line, and that detects a current flowing from the first power storage device to the second power storage device so as to output a voltage corresponding to the current; and
    a switching regulator that detects an output voltage of the current detection circuit, and that performs a switching operation of the current limiter so that the output voltage is equal to a predetermined reference voltage,
    wherein the controller
    acquires open circuit voltage Vin_oc on an output side of the RF-DC conversion circuit, which is obtained when the RF-DC conversion circuit and the DC-DC converter are disconnected from each other, and target voltage αVin_oc (0<α<1) obtained by dividing open circuit voltage Vin_oc, and
    wherein when the RF-DC conversion circuit and the DC-DC converter are connected to each other, the controller performs feedback control of the DC-DC converter so that input voltage Vin on a side where the DC-DC converter is connected to the RF-DC conversion circuit is equal to target voltage αVin_oc.

2. The terminal of claim 1,
    wherein the controller includes a sampling capacitor charged with target voltage αVin_oc, and performs the feedback control of the DC-DC converter, based on a voltage of the sampling capacitor.

3. The terminal of claim 1, further comprising:
    at least one load driven by a DC voltage output by the DC-DC converter, wherein the load includes at least one of a sensor for detecting an external environment and a wireless transceiver.

4. The terminal of claim 1,
wherein the controller intermittently acquires open circuit voltage Vin_oc.

5. The terminal of claim 1,
wherein the controller includes
- a voltage dividing circuit connected between the RF-DC conversion circuit and the DC-DC converter so as to acquire target voltage αVin_oc, based on input voltage Vin, and
- a switch that is connected to an output side of the voltage dividing circuit, that blocks an output of the voltage dividing circuit, and that transmits the output of the voltage dividing circuit only when the open circuit voltage Vin_oc is acquired.

6. The terminal of claim 1,
wherein the switching regulator includes a hysteresis comparator that receives an input of the charging voltage of the first power storage device,
wherein in a case where the charging voltage of the first power storage device falls beyond a predetermined charging start voltage higher than the threshold voltage, the current limiter is closed so as to start charging the second power storage device, and
wherein in a case where the charging voltage of the first power storage device falls below a predetermined charging stop voltage higher than the threshold voltage and lower than the charging start voltage, the current limiter is opened so as to stop charging the second power storage device.

\* \* \* \* \*